(12) United States Patent
Ghosh et al.

(10) Patent No.: US 12,273,732 B2
(45) Date of Patent: Apr. 8, 2025

(54) APPARATUS AND METHOD FOR COEXISTENCE BETWEEN WI-FI COMMUNICATION AND BLUETOOTH COMMUNICATION

(71) Applicant: Intel Corporation, Santa Clara, CA (US)

(72) Inventors: Chittabrata Ghosh, Fremont, CA (US); Harish Balasubramaniam, San jose, CA (US); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 925 days.

(21) Appl. No.: 17/133,645

(22) Filed: Dec. 24, 2020

(65) Prior Publication Data

US 2021/0204140 A1    Jul. 1, 2021

(51) Int. Cl.

| | |
|---|---|
| *H04W 16/14* | (2009.01) |
| *H04L 1/00* | (2006.01) |
| *H04W 4/80* | (2018.01) |
| *H04W 28/26* | (2009.01) |
| *H04W 84/12* | (2009.01) |

(52) U.S. Cl.
CPC .......... *H04W 16/14* (2013.01); *H04L 1/0068* (2013.01); *H04W 4/80* (2018.02); *H04W 28/26* (2013.01); *H04W 84/12* (2013.01)

(58) Field of Classification Search
CPC ....... H04W 16/14; H04W 4/80; H04W 28/26; H04W 84/12; H04W 88/06; H04W 72/1215; H04W 76/16; H04L 1/0068; H04L 5/0044; H04L 5/0094; H04L 1/0013
USPC ......... 370/329; 455/41.2, 63.1, 114.2, 278.1, 455/296, 450–452.2
See application file for complete search history.

(56) References Cited

U.S. PATENT DOCUMENTS

| | | | |
|---|---|---|---|
| 2006/0292986 A1* | 12/2006 | Bitran | H04W 16/14 455/562.1 |
| 2008/0130519 A1* | 6/2008 | Bahl | H04W 16/14 370/254 |
| 2015/0312623 A1* | 10/2015 | Li | H04N 21/472 725/74 |
| 2017/0127382 A1* | 5/2017 | Zhang | H04W 72/30 |
| 2018/0248811 A1* | 8/2018 | Di Nallo | H04L 5/0087 |
| 2021/0281357 A1* | 9/2021 | Verma | H04L 1/1614 |

* cited by examiner

Primary Examiner — Michael Y Mapa
(74) Attorney, Agent, or Firm — East IP P.C.

(57) ABSTRACT

Provided herein are apparatus and methods for coexistence between Wi-Fi communication and Bluetooth communication. An apparatus for a UE includes: a Wi-Fi module to perform Wi-Fi communication; a Bluetooth module to perform Bluetooth communication; and interface circuitry coupled with both of the Wi-Fi module and the Bluetooth module; wherein the Wi-Fi module is to: obtain event schedule information from the Bluetooth module via the interface circuitry, wherein the event schedule information is to indicate information about a schedule of the Bluetooth communication; and puncture, based on the event schedule information, a secondary channel for the Wi-Fi communication to reserve a sub-channel for the Bluetooth communication. Other embodiments may also be disclosed and claimed.

13 Claims, 17 Drawing Sheets

APPARATUS AND METHOD FOR COEXISTENCE BETWEEN WI-FI COMMUNICATION AND BLUETOOTH COMMUNICATION

TECHNICAL FIELD

Embodiments of the present disclosure generally relate to wireless communications, and in particular to apparatus and methods for coexistence between Wireless Fidelity (Wi-Fi) communication and Bluetooth communication.

BACKGROUND ART

More and more wireless devices are developed with both of Wi-Fi feature and Bluetooth feature. More and more studies focus on coexistence between Wi-Fi communication and Bluetooth communication. Improvement of coexistence capability is required.

BRIEF DESCRIPTION OF THE DRAWINGS

Embodiments of the disclosure will be illustrated, by way of example and not limitation, in the figures of the accompanying drawings in which like reference numerals refer to similar elements.

DETAILED DESCRIPTION OF EMBODIMENTS

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

Figure 1:
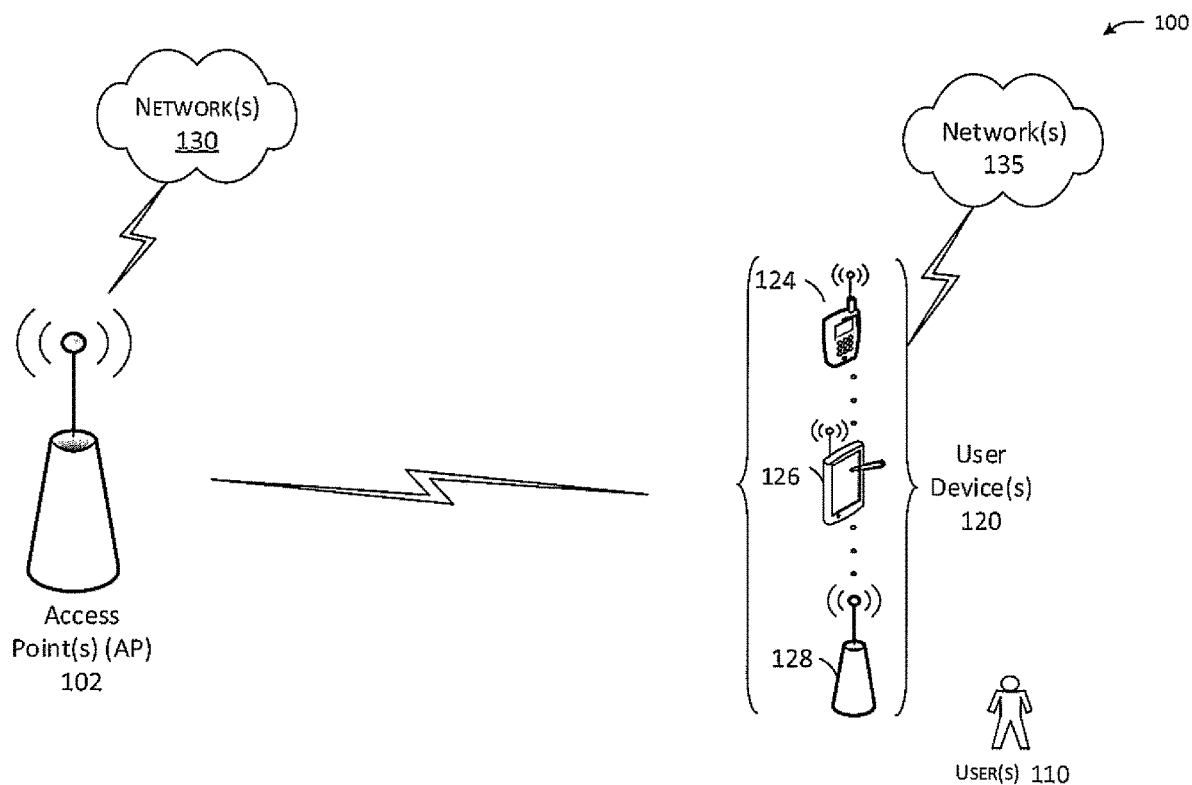
FIG. 1 illustrates a network diagram illustrating an example network environment in accordance with one or more example embodiments of the present disclosure.

FIG. 1 illustrates a network diagram illustrating an example network environment in accordance with one or more example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 10:
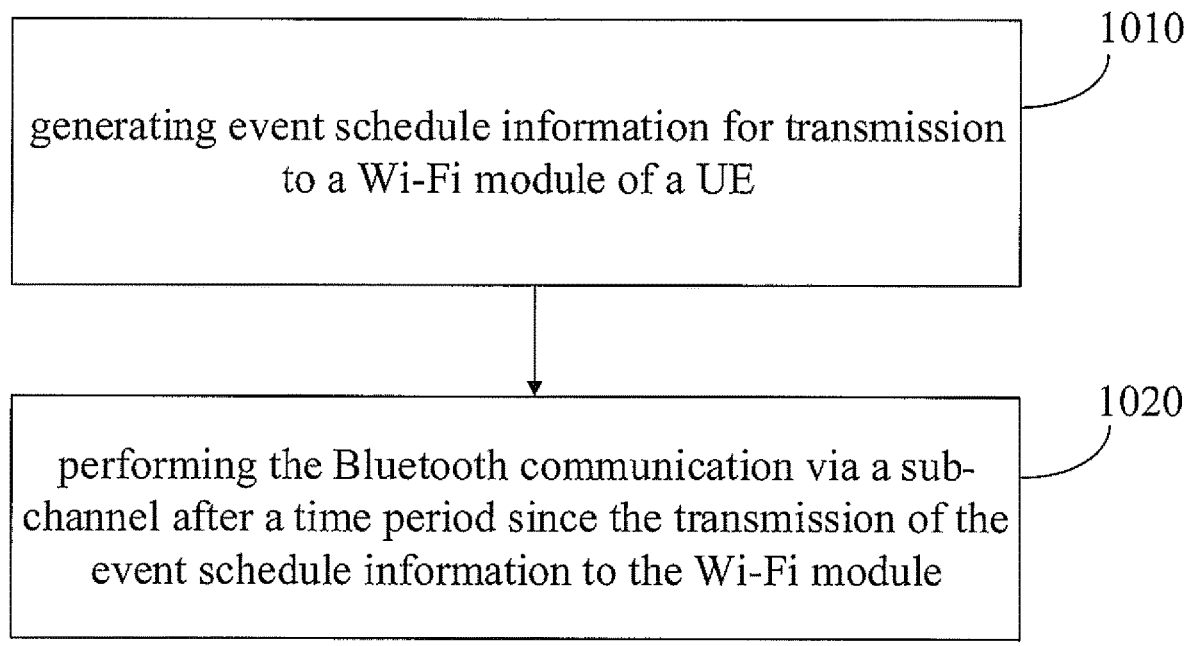
FIG. 10 illustrates a flowchart of a method for coexistence between Wi-Fi communication and Bluetooth communication in accordance with one or more example embodiments of the present disclosure.
Figure 11:
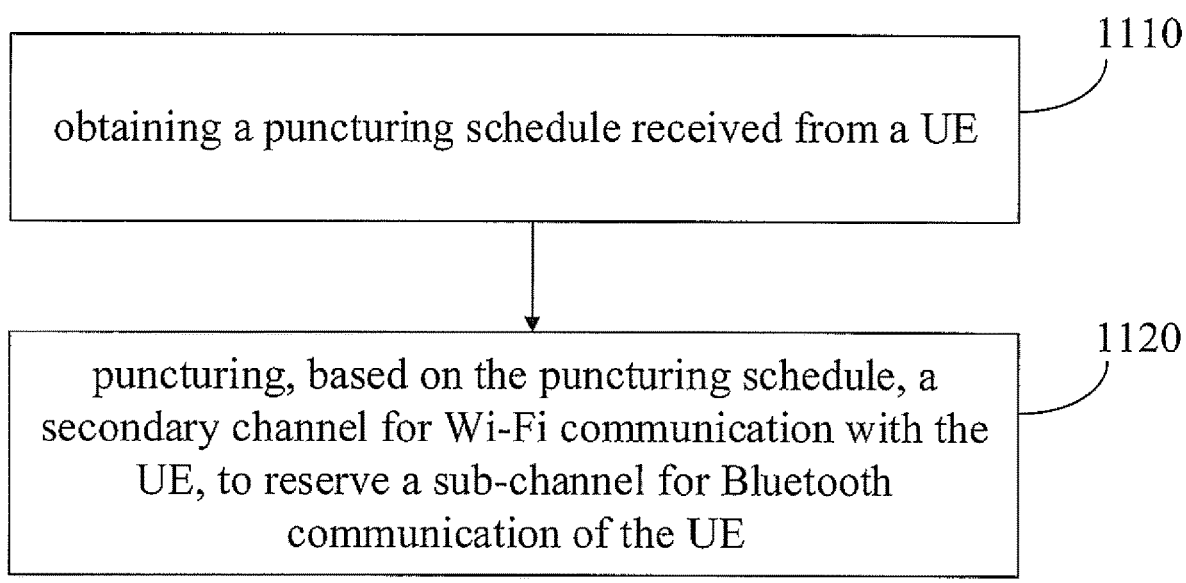
FIG. 11 illustrates a flowchart of a method for coexistence between Wi-Fi communication and Bluetooth communication in accordance with one or more example embodiments of the present disclosure.

In some embodiments, the user devices 120 and the AP 102 may include one or more computer systems similar to that of the functional diagram of FIG. 10 and/or the example machine/system of FIG. 11.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Any of the user device(s) 120 (e.g., user devices 124, 126, 128) and AP(s) 102 may include one or more Bluetooth components to support Bluetooth communication. In some embodiments, any of the user device(s) 120 (e.g., user devices 124, 126, 128) and AP(s) 102 may support various communication at the same time, for example, but not limited to, Wi-Fi communication and Bluetooth communication.

It is understood that the above descriptions are for purposes of illustration and are not meant to be limiting.

For a UE (e.g., user device(s) 120 and/or AP(s) 102 of FIG. 1) where both of Bluetooth communication and Wi-Fi communication are supported, Bluetooth Basic Rate/Enhanced Data Rate (BR/EDR) and/or Low Energy (BLE) traffic might be interfered with Wi-Fi operation, e.g., in 40 MHz within 2.4 GHz band.

There are some use cases of Bluetooth channel interference from Wi-Fi operation. In a first use case, BLE based discovery and connection establishment between devices involves sending of advertising packets on three primary advertising channels. The choice of these three channels were made to not conflict with the widely used Wi-Fi 20 MHz channels 1, 6, and 11. However with Wi-Fi 40 MHz operation, there is a chance that two out of three BLE advertising channels are blocked by Wi-Fi operation. This would negatively affect discovery and connection establishment time by more than doubling it (according to discovery time analysis shared in Bluetooth special interest group (BT SIG) when one or two of the channels are blocked), which would also increase the energy consumption for BLE devices and deteriorate user experience.

Figure 2:
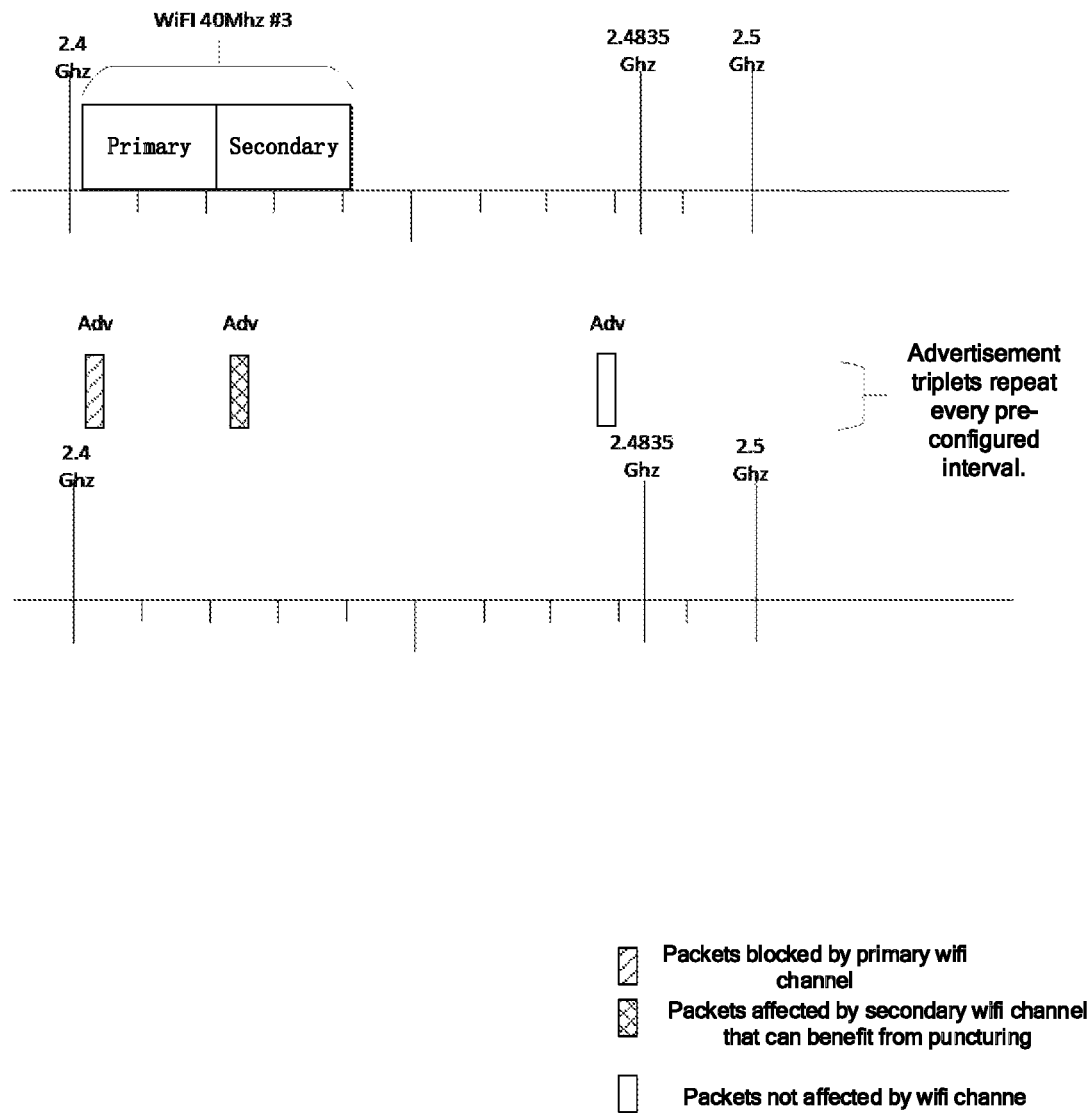
FIG. 2 illustrates an example of Wi-Fi interference on Bluetooth Low Energy (BLE) advertising channels in 2.4 GHz band.

FIG. 2 illustrates an example of Wi-Fi interference on Bluetooth Low Energy (BLE) advertising channels in 2.4 GHz band. As shown in FIG. 2, the Wi-Fi operation uses 40 MHz channel #3 and it may conflict with the use of BLE primary advertising channels. Losing two out of three advertisements could impact discovery time significantly. Hence use of puncturing to deliver two of three advertisements may improve discovery time. For example, one blocked channel could increase discovery time by 60%; two blocked channels could increase discovery time by more than 100%.

In a second use case, Bluetooth BR/EDR based discovery and connection establishment between devices involves sending of short Inquiry and Page packets over a set of 32 frequencies. When Wi-Fi 40 MHz mode of operation is used in 2.4 GHz band, this may result in a blockage of several of those packets. A lot of Bluetooth devices (like Audio headsets and others) still make use of BR/EDR based discovery and connections. This scenario would result in increase of discovery and connection establishment time and bad user experience.

Figure 3:
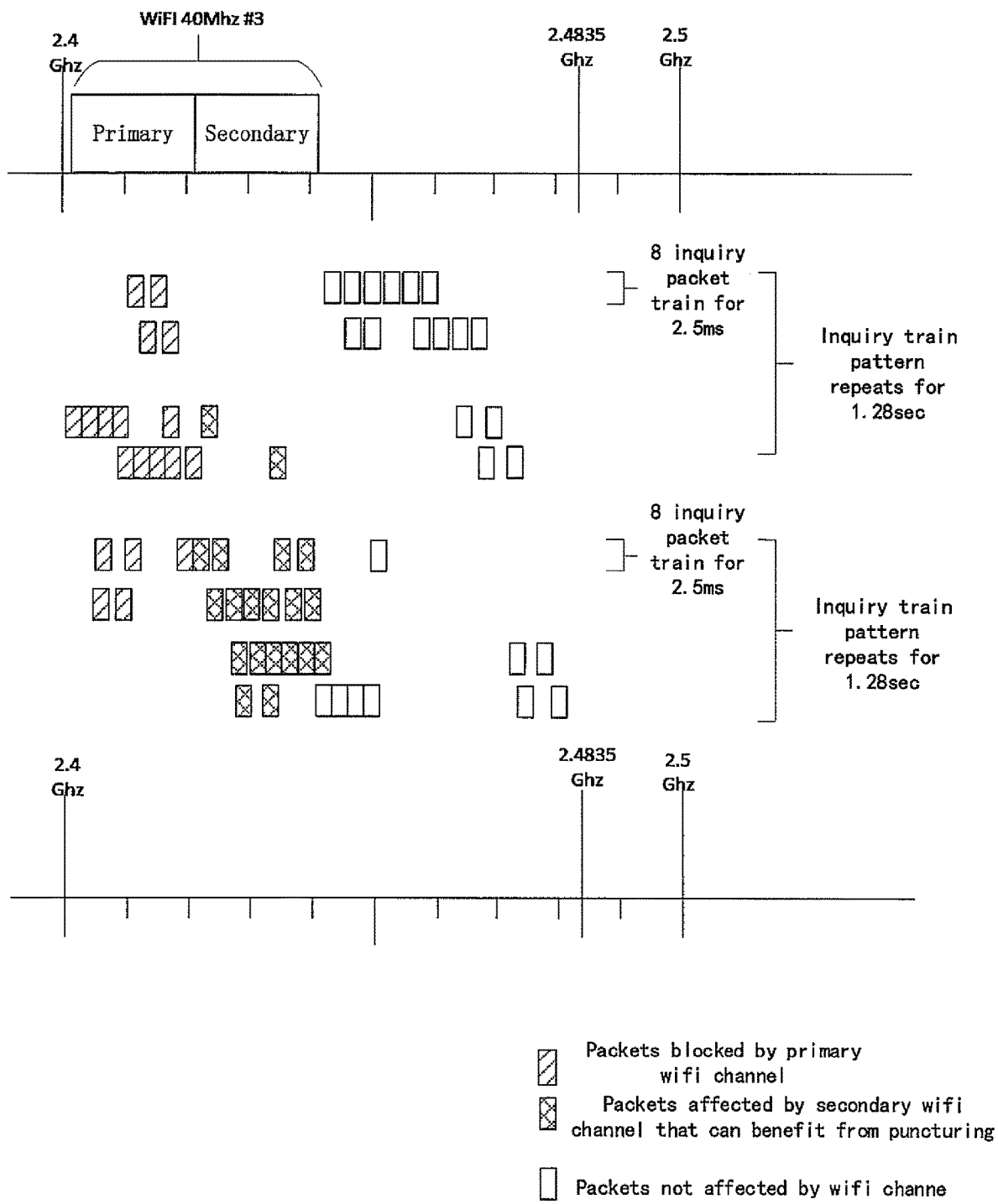
FIG. 3 illustrates an example of Wi-Fi interference on Bluetooth Basic Rate/Enhanced Data Rate (BR/EDR) inquiry/page packets in 2.4 GHz band.

FIG. 3 illustrates an example of Wi-Fi interference on Bluetooth Basic Rate/Enhanced Data Rate (BR/EDR) inquiry/page packets in 2.4 GHz band. As shown in FIG. 3, Wi-Fi 40 MHz channel #3 coexists with BR/EDR based Inquiry procedure. The packets blocked by primary Wi-Fi channel and the packets affected by secondary Wi-Fi channel may correspond to a period of time (about 1.28 second) when a large portion of Inquiry packets are lost due to Wi-Fi communication.

In a scenario where Bluetooth Adaptive Frequency Hopping (AFH) is applicable for data or audio connections, Bluetooth uses adaptive frequency hopping to select usable channels, e.g., in the 2.4 GHz band. Bluetooth BR/EDR is widely used by a large amount of audio devices. BR/EDR based connections requires a minimum of 15 usable channels, for example. When there is heavy presence of Wi-Fi (both collocated and non-collocated) in the environment, it gets difficult to find the usable set of 15 channels. Though BLE based connections require only a minimum of 2 channels, BLE based audio applications could benefit by using a protected set of usable channels so as to minimize interference.

Figure 4:
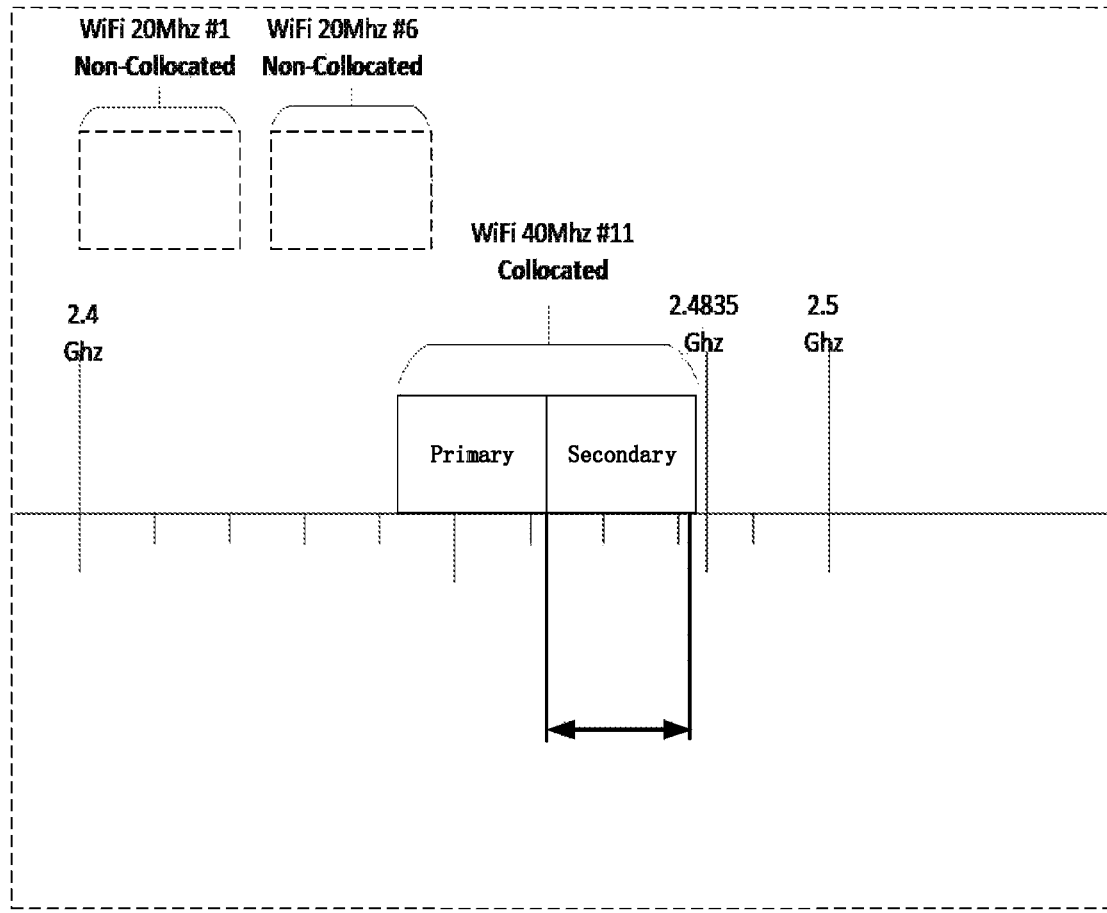
FIG. 4 illustrates an example of Wi-Fi interference on Bluetooth connection.

FIG. 4 illustrates an example of Wi-Fi interference on Bluetooth connection. As shown in FIG. 4, the 2.4 GHz band is heavily used by several Wi-Fi access points some of which are non-collocated. Bluetooth operation may request to reserve data channels with collocated Wi-Fi operation by using puncturing in the secondary channel as shown in FIG. 4.

In a third use case, Bluetooth based Angle and Distance measurement is involved. BLE based angle measurement (e.g., Angle of Arrival (AoA)/Angle of Departure (AoD)) was introduced in Bluetooth v5.1 specification. The BT SIG is also working on a distance measurement feature for a future release. In both features, phase measurement is used and it may help to use a larger portion of the 2.4 GHz industrial, scientific and medical (ISM) band to make robust measurements to protect against multipath interference. By using Wi-Fi preamble puncturing discussed in this disclosure, an extra 20 MHz is available when required by the Bluetooth communication to schedule its phase measurements.

Figure 5:
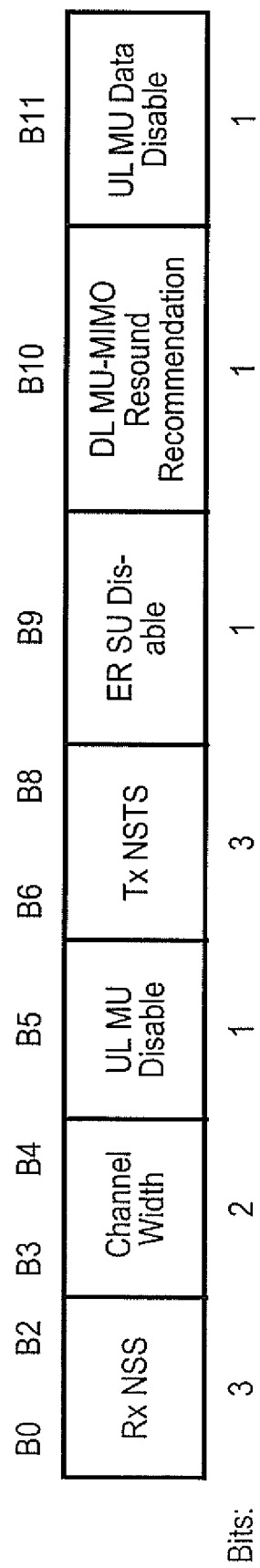
FIG. 5 illustrates a control information subfield format in Operation Mode (OM) control subfield within a HE A-control field of a MAC header.

Wi-Fi 6 or IEEE 802.11ax amendment has defined specific features for its coexistence with Bluetooth devices in the same band. FIG. 5 illustrates a control information subfield format in Operation Mode (OM) control subfield within a HE A-control field of a MAC header. As shown in FIG. 5, for example, a 1-bit uplink (UL) multi-user (MU) Disable subfield or a 1-bit UL MU Data Disable subfield may be transmitted from a Wi-Fi STA to a Wi-Fi AP to inform its ability/disability of UL MU transmission.

The above signaling may assist a Wi-Fi STA (e.g., a Wi-Fi 6 STA) to allow a BLE device to continue its scheduled transmission at that time in the same band, by not participating in an UL MU data transmission. This potentially allows channel access time of around 2-3 ms for an event or even a sub-event transmission of a pair of BLE devices.

However, until the time instant where the UL MU Disable or UL MU Data Disable field values are changed, the STA is unable to participate in MU UL data transmissions. This implies that even the BLE event or sub-event transmissions are for short duration, a Wi-Fi STA might have to rely on PHY protocol data unit (PPDU) transmissions on a long-term basis until the next OM HE A-control field is transmitted with changed values.

Preamble puncturing is proposed in IEEE P802.11ax™/D6.0 (November 2019) where an OFDMA frame avoids transmissions in certain subcarriers, thereby occupying non-contiguous sets of sub-carriers within a given channel bandwidth. Currently, preamble puncturing is proposed to be used only in PPDU transmissions over 80 MHz and 160 MHz channel BW in 5 GHz band.

Figure 6:
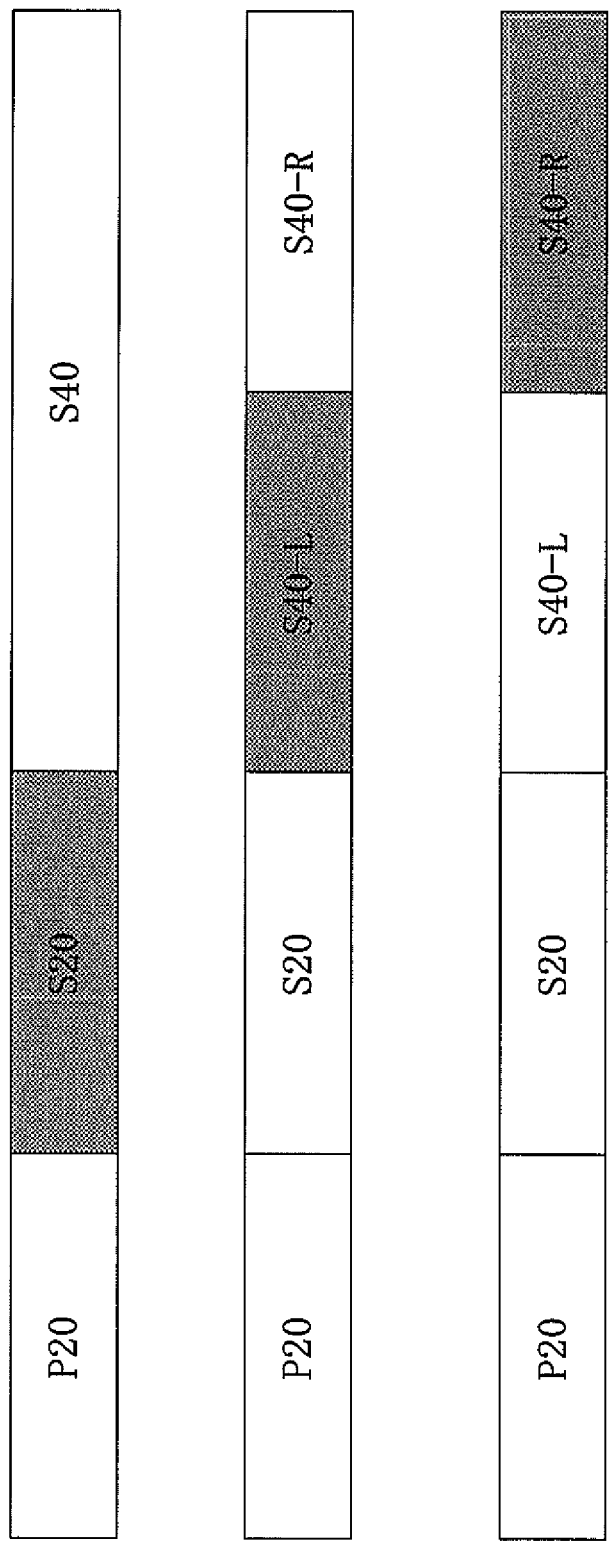
FIG. 6 illustrates an example of a punctured 20 MHz channel in different configurations of 80 MHz channel bandwidth.

FIG. 6 illustrates an example of a punctured 20 MHz channel in different configurations of 80 MHz channel bandwidth. As shown in FIG. 6, preamble puncturing in 80 MHz is depicted with secondary 20 MHz channel (S20), lower (left) secondary 40 MHz channel (S40-L) and upper (right) secondary 40 MHz channel (S40-R) punctured respectively.

As shown in FIG. 6, an intermediate 20 MHz is punctured, assuming Bluetooth operation is in one of the 2 MHz channel within the punctured 20 MHz channel bandwidth. The figure also depicts that the Wi-Fi signal still spans over the primary 20 MHz channel and the secondary 40 MHz channel, while coexisting with Bluetooth in the intermediate secondary channel.

The disclosure provides a mechanism for a Bluetooth module to inform a Wi-Fi module about its frequency usage pattern, either in short-term or long-term. On the availability of the usage pattern as indicated in the above critical three use cases, the Wi-Fi module may use preamble puncturing to implement coexistence between the Wi-Fi communication and a Bluetooth communication when operating in 2.4 GHz band or even in future operating in 5 GHz, 6 GHz bands or the like. Further to preamble puncturing, puncturing is designed in granularity of sub-multiples (for example, 26 tones/2 MHz or 52 tones/4 MHz) of 20 MHz.

As described above, the UL MU Disable and UL MU Data Disable subfields are defined in OM HE A-Control field, which may be transmitted from the Wi-Fi STA to the Wi-Fi AP to inform its ability/disability of UL MU transmission as means of coexistence with Bluetooth communication. OM Control UL MU Data Disable RX Support is a 1 bit subfield in MAC Capabilities IE. This subfield may be used by the Wi-Fi AP to indicate whether it can support reception (Rx) of OM with UL MU Data Disable bit. Table 1 below illustrates interpretation of the combination of the three subfields.

TABLE 1

Interpretation of combination of the UL MU Disable and UL MU Data Disable subfields and OM Control UL MU Data Disable RX Support subfield

| UL MU Disable subfield | UL MU Data Disable subfield | Interpretation by an AP that transmits a value of 0 in the OM Control UL MU Data Disable RX Support | Interpretation by an AP that transmits a value of 1 in the OM Control UL MU Data Disable RX Support |
|---|---|---|---|
| 0 | 0 | All trigger based UL MU transmissions are enabled by the STA as defined in 26.5.2 (UL MU operation). | All trigger based UL MU transmissions are enabled by the STA as defined in 26.5.2 (UL MU operation). |
| 0 | 1 | N/A | Trigger based UL MU Data frame transmissions in response to a Basic Trigger frame are suspended by the STA as defined in 26.9.3 (Transmit operating mode (TOM) indication). Other trigger based UL MU transmissions remain enabled by the STA as defined in 26.9.3 (Transmit operating mode (TOM) indication). |
| 1 | 0 | All trigger based UL MU transmissions are suspended by the STA. The STA will not respond to a received Trigger frame or MPDU containing a TRS Control subfield. | All trigger based UL MU transmissions are suspended by the STA. The STA will not respond to a received Trigger frame or MPDU containing a TRS Control subfield. |
| 1 | 1 | Reserved | Reserved |

The disadvantage of the above mechanism based on the indication of these subfields is targeted for only long-term operation, separated by the transmission of a first OM Control subfield with a value of 1 either in UL MU Disable subfield or UL MU Data Disable subfield and then setting the value to 0 in either of those subfields in a next second OM Control subfield transmission. If the Bluetooth transmission is known to be overlapping with an "expected" Wi-Fi transmission for a short duration, e.g., 2-3 ms, then a different solution needs to be defined, as the long-term operation above would increase overhead in time consuming.

Figure 7:
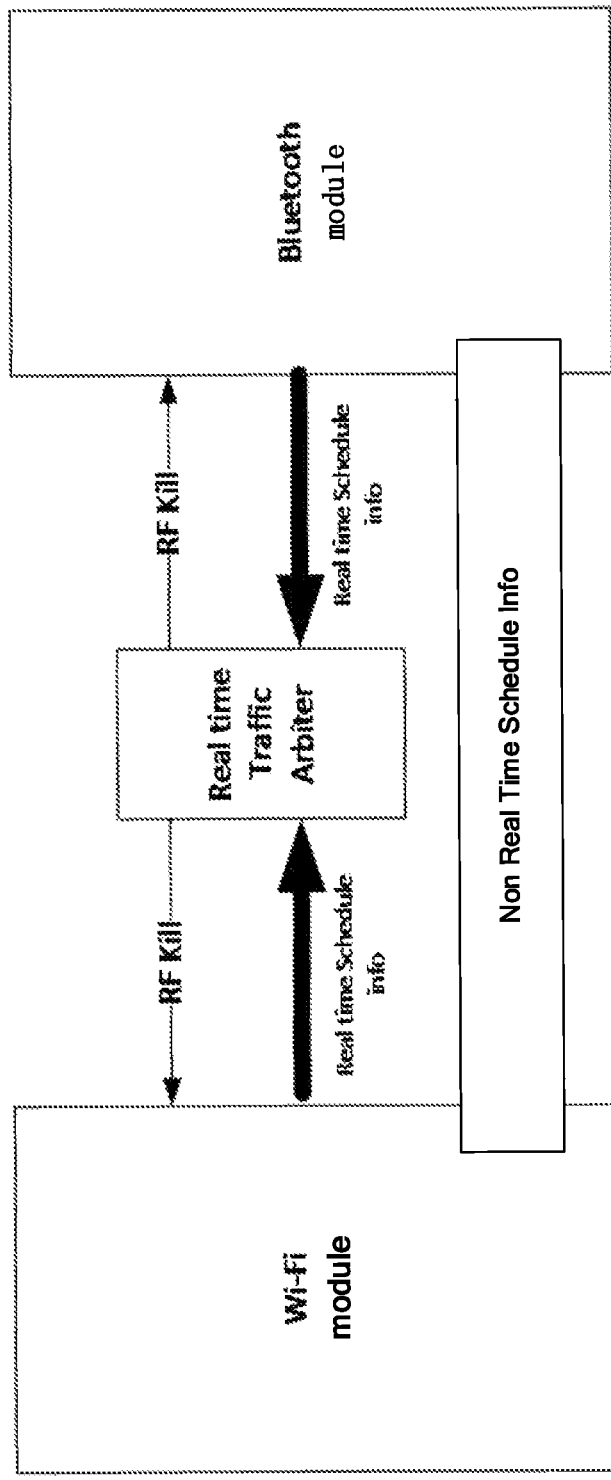
FIG. 7 illustrates a mechanism of coexistence between Wi-Fi communication and Bluetooth communication in accordance with one or more example embodiments of the present disclosure.

FIG. 7 illustrates a mechanism of coexistence between Wi-Fi communication and Bluetooth communication in accordance with one or more example embodiments of the present disclosure.

Combo Wi-Fi module and Bluetooth module of a device (e.g., a UE) may implement a coexistence mechanism to optimally schedule respective RF transmission and reception. As shown in FIG. 7, the coexistence mechanism may involve a real time interface and a non-real time interface. A real time arbiter may processes the near-term scheduling of RF traffic from both of the Wi-Fi module and the Bluetooth module. In case of a conflict, the arbiter may prioritize and issue an RF kill signal to the lower priority traffic. However, overuse of RF kill using the real time arbiter would lead to less than optimal performance.

It may be advantageous to inform the collocated Wi-Fi module a little ahead in time about the traffic schedule of the Bluetooth module using the non-real time interface, so that the collocated Wi-Fi module can make use of the non-real time scheduling information to reserve or adjust usage of frequency and time resources with link layer or MAC protocol messaging. Spectral usage in 2.4 GHz and any other band may also be shared using this non-real time interface.

In some embodiments, when the Bluetooth module sends schedule information to the Wi-Fi module of the device via the non-real time interface, the Wi-Fi module of the device needs time to update its puncturing schedule with the Wi-Fi AP that is connected with the device. The ahead time period may be determined based on the interacting time required between the Wi-Fi module of the device and the Wi-Fi AP in updating the puncturing schedule. In some embodiments, alternatively or additionally, when the Wi-Fi module sends schedule information to the Bluetooth module, the Bluetooth module may look to update hopping sequence of its existing connections. Thus, the ahead time period may be determined, alternatively or additionally, based on the time required for updating hopping sequence. For example, the updating of hopping sequence of existing connections would take 6 times the Connection Interval used on those connections, thus the ahead time period may be 100 ms or more, for example.

As discussed above, in some embodiments, the Bluetooth module may exchange its scheduling needs (e.g., BLE advertising, BR/EDR inquiry/paging etc) to the Wi-Fi module. The schedule event may be periodic and may be frequent based on the type of application (e.g., audio frame exchange). The schedule event may also be bursty for example, BR/EDR inquiry and page, BLE discovery, or the like.

The BR/EDR inquiry and page and BLE discovery schedule may overlap with the secondary 20 MHz channel (two out of three BLE advertising channels may be impacted when Wi-Fi operates in Channel #3 for 40 MHz operation, as shown in FIG. 2). The Wi-Fi module may use event schedule information obtained from the Bluetooth module to use puncturing to facilitate the Bluetooth communication in the punctured channel to complete successfully.

The event schedule information is to indicate information about a schedule of the Bluetooth communication. In some embodiments, the event schedule information may include information about a bandwidth of the sub-channel required by the Bluetooth communication, a start time instance of the Bluetooth communication, or a duration of the Bluetooth communication. In some other embodiments, the event schedule information may include other information about the Bluetooth communication. The present disclosure is not limited in this respect.

Based on the event schedule information, the Wi-Fi module of the device may puncture corresponding channel for the Bluetooth communication. For example, the Wi-Fi module of the device may puncture the secondary channel for the Wi-Fi transmission to reserve a sub-channel with the bandwidth indicated in the event schedule information starting from the start time instance indicated in event schedule information for the duration indicated in the event schedule information.

Figure 8:
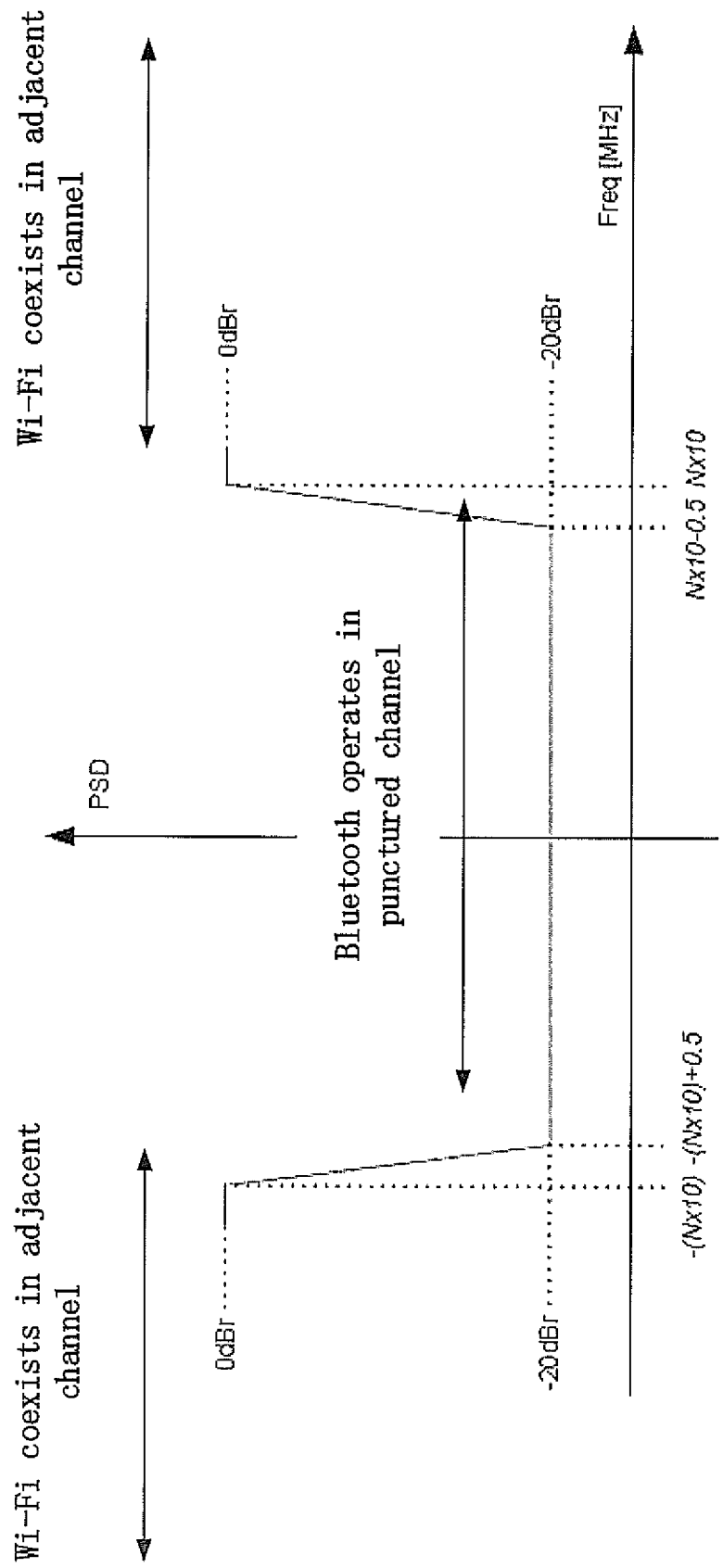
FIG. 8 illustrates a puncturing example in accordance with one or more example embodiments of the present disclosure.

In some embodiments, the bandwidth of the sub-channel for the Bluetooth communication is 2 MHz (26 tone-Resource Unite (RU)). In some embodiments, in order to prevent spectral leakage, the Wi-Fi module may also puncture a 4 MHz (52 tone-RU) channel, providing a guard band of 1 MHz on either side of the 2 MHz channel bandwidth. FIG. 8 illustrates a puncturing example in accordance with one or more example embodiments of the present disclosure. As shown in FIG. 8, a narrower guard band is punctured, such that the remaining unoccupied sub-carriers within the overlapping 20 MHz channel is used either for pilot (channel estimation) or data transmission for the Wi-Fi communication. They are examples of bandwidth of the sub-channel for the Bluetooth communication and its guard band, and other values for the bandwidth of the guard band are applicable. The present disclosure is not limited in this respect.

Figure 9:
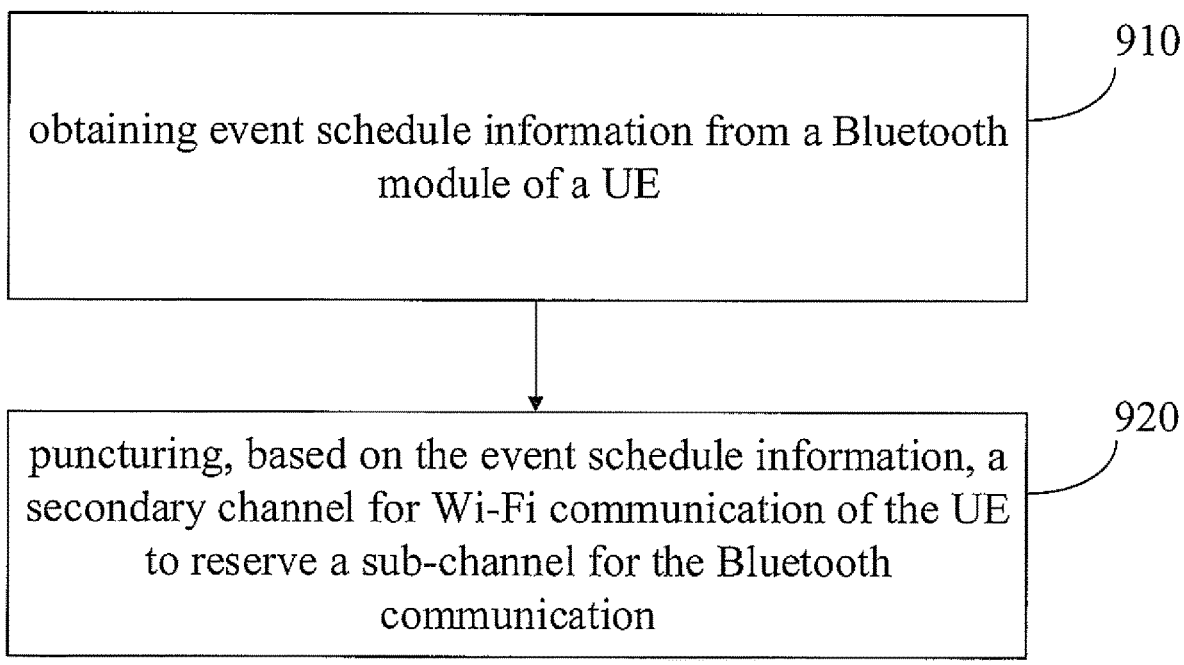
FIG. 9 illustrates a flowchart of a method for coexistence between Wi-Fi communication and Bluetooth communication in accordance with one or more example embodiments of the present disclosure.

FIG. 9 illustrates a flowchart of a method 900 for coexistence between Wi-Fi communication and Bluetooth communication in accordance with one or more example embodiments of the present disclosure. The method 900 may include steps 910 and 920, which may be performed by a UE, e.g. a Wi-Fi module of the UE.

At 910, event schedule information may be obtained from a Bluetooth module of the UE, e.g., via interface circuitry coupled with both of the Wi-Fi module and the Bluetooth module. The event schedule information may be used to indicate information about a schedule of the Bluetooth communication.

At 920, a secondary channel for Wi-Fi communication of the UE is punctured based on the event schedule information, to reserve a sub-channel for the Bluetooth communication.

In some embodiments, the event schedule information may indicate a bandwidth of the sub-channel, start time of the Bluetooth communication, or a duration of the Bluetooth communication. In some embodiments, the secondary channel for the Wi-Fi communication is punctured to reserve the sub-channel with the bandwidth starting from the start time for the duration indicated in the event schedule information.

In some embodiments, the bandwidth of the sub-channel includes 1 MHz or 2 MHz.

In some embodiments, the secondary channel for the Wi-Fi communication is 20 MHz in bandwidth.

In some embodiments, the event schedule information is obtained from the Bluetooth module ahead of a time period than occurrence of the Bluetooth communication. In some embodiments, the schedule of the Bluetooth communication is periodic or bursty.

In some embodiments, the Bluetooth communication may include a BLE advertising message or a BR/EDR inquiry/page packet.

In some embodiments, the secondary channel for the Wi-Fi communication is punctured to further reserve a guard channel on either side of the sub-channel, as discussed above.

FIG. 10 illustrates a flowchart of a method 1000 for coexistence between Wi-Fi communication and Bluetooth communication in accordance with one or more example embodiments of the present disclosure. The method 1000 may include steps 1010 and 1020, which may be performed by a UE, e.g. a Bluetooth module of the UE.

At 1010, event schedule information is generated for transmission to the Wi-Fi module of the UE via the interface circuitry. The event schedule information may indicate information about a schedule of Bluetooth communication.

At 1020, the Bluetooth communication is performed via a sub-channel after a time period since the transmission of the event schedule information to the Wi-Fi module. The sub-channel is punctured from a secondary channel for the Wi-Fi communication by the Wi-Fi module based on the event schedule information.

In some embodiments, the event schedule information is to indicate a bandwidth of the sub-channel, start time of the Bluetooth communication, or a duration of the Bluetooth communication.

In some embodiments, the bandwidth of the sub-channel includes 1 MHz or 2 MHz.

In some embodiments, the secondary channel for the Wi-Fi communication is 20 MHz in bandwidth.

In some embodiments, the schedule of the Bluetooth communication is periodic or bursty.

In some embodiments, the Bluetooth communication may include a BLE advertising message or a BR/EDR inquiry/page packet.

FIG. 11 illustrates a flowchart of a method 1100 for coexistence between Wi-Fi communication and Bluetooth communication in accordance with one or more example embodiments of the present disclosure. The method 1100 may include steps 1110 and 1120, which may be performed by an AP, e.g. a Wi-Fi AP that is communicated with the UE.

At 1110, a puncturing schedule is obtained from the UE. The puncturing schedule is based on information about a schedule of Bluetooth communication of the UE At 1120, a secondary channel for Wi-Fi communication with the UE is punctured based on the puncturing schedule, to reserve a sub-channel for Bluetooth communication of the UE.

In some embodiments, the information about a schedule of the Bluetooth communication of the UE includes a bandwidth of the sub-channel, start time of the Bluetooth communication, or a duration of the Bluetooth communication. In some embodiments, the secondary channel for the Wi-Fi communication is punctured to reserve the sub-channel with the bandwidth starting from the start time for the duration.

In some embodiments, the puncturing schedule is obtained from the UE ahead of a time period than occurrence of the Bluetooth communication.

In some embodiments, the secondary channel for the Wi-Fi communication is punctured to further reserve a guard channel on either side of the sub-channel.

With the technical solutions of coexistence between Wi-Fi communication and Bluetooth communication described in the present disclosure, puncturing is performed on-demand, in particular, based on demand of Bluetooth communication.

In the case of BLE Advertising, by using puncturing scheme discussed in this disclosure, at least two out of three packets can be successfully transmitted by reserving the time slots and spectral resources in advance with the co-located Wi-Fi module, and hence the discovery time is saved by around 60%.

In the case of BR/EDR Inquiry or Paging, by using puncturing scheme discussed in this disclosure, the discovery and connection establishment time can be significantly decreased.

In the case of applications using BLE or BR/EDR connections (like audio, data, or location), by using puncturing scheme discussed in this disclosure, the transmission and reception on AFH channels in densely used Wi-Fi environments can be protected, the robustness of the Bluetooth links can be improved, and the user experience can be enhanced.

The disclosure involves the use of preamble puncturing in 40 MHz or in resource units smaller or equal to 20 MHz channel bandwidth. In the mechanisms of coexistence between Wi-Fi communication and Bluetooth communication, the Bluetooth module may share its event schedule (bandwidth in granularity of 1 MHz or 2 MHz, start times, and transmission duration) with Wi-Fi module, so as to as puncturing in the overlapping secondary 20 MHz channel bandwidth (for example in 2.4 GHz channel) by a Wi-Fi 6 or future Wi-Fi device, when a Bluetooth transmission is expected in any 1 MHz or 2 MHz channel bandwidth within the secondary 20 MHz bandwidth. The same idea could be extended to sub-6 GHz band or even higher spectrum where Wi-Fi operates or will operate in future, and if Bluetooth technology extends to such higher spectrum.

In some embodiments, as discussed above, the puncturing is implemented on the exact 2 MHz (or puncturing an additional 2 MHz to provide guard band and signal leakage) channel of Bluetooth operation within the 20 MHz channel bandwidth for Wi-Fi operation.

The Bluetooth transmissions may continue without interruption in 1 MHz or 2 MHz channel within the secondary 20 MHz bandwidth, resulting in fewer events getting lost. Devices that use BLE Constant Tone Extension (or may use new proposed phase measurement techniques in BT SIG) to do positioning would like to use a broader spectrum to achieve better robustness against multipath. In such a case, these devices would benefit from using the secondary 20 MHz channel when a measurement is required. These effects work by puncturing enough frequency and time resources within secondary 20 MHz channel for Bluetooth operation as required.

Some embodiments of the disclosure describes a short-term method of Bluetooth and Wi-Fi coexistence. Some embodiments of the disclosure describes a long-term method of Bluetooth and Wi-Fi coexistence. Some embodiments include connection of short-term coexistence mechanism with long-term coexistence mechanism. The present disclosure is not limited in this respect. With the preamble puncturing mechanism of the present disclosure, both Wi-Fi and Bluetooth transmissions can concurrently be exchanged in two different networks, thus the system efficiency can be improved.

Figure 12:
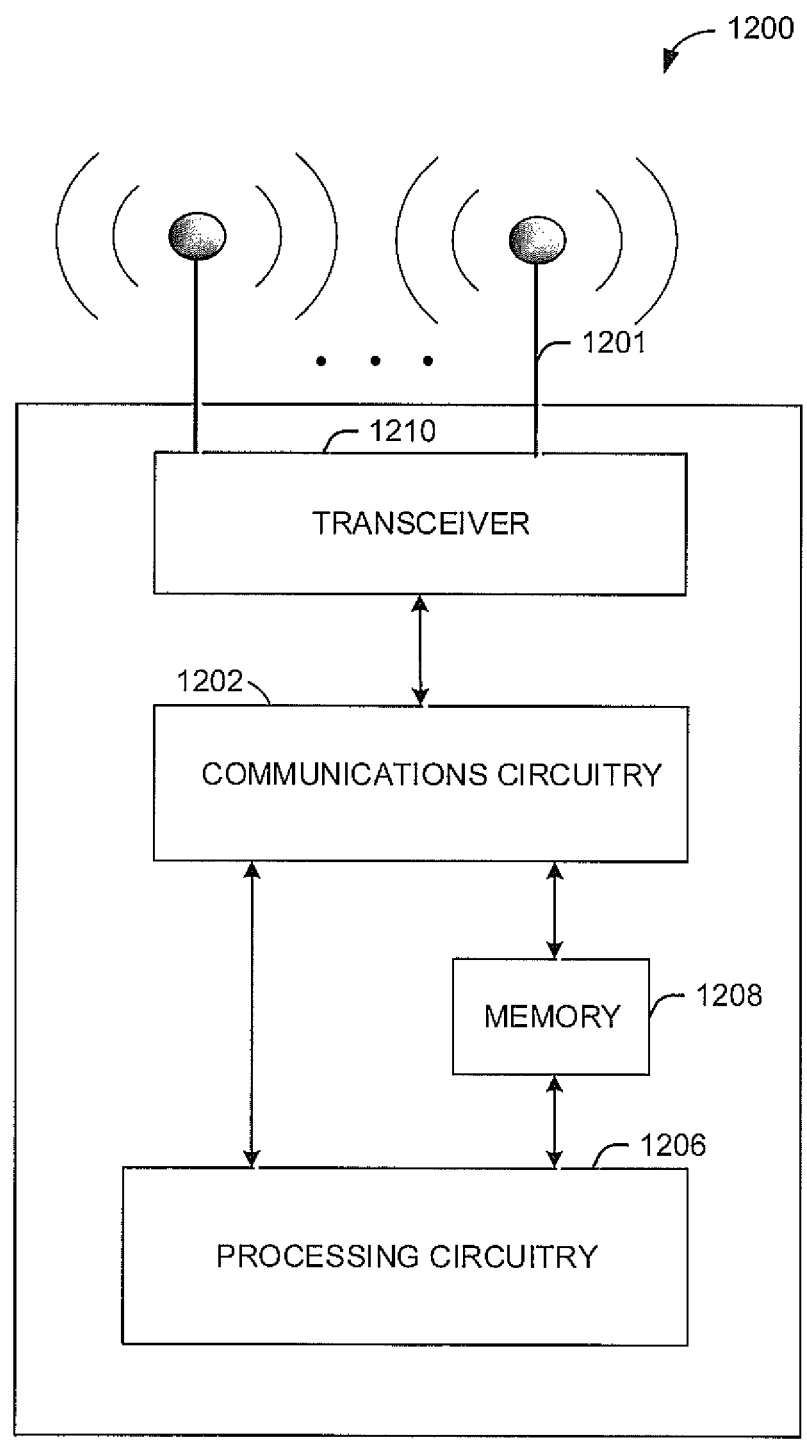
FIG. 12 illustrates a functional diagram of an exemplary communication station that may be suitable for use as a user device, in accordance with one or more example embodiments of the present disclosure.

FIG. 12 shows a functional diagram of an exemplary communication station 1200, in accordance with one or more example embodiments of the present disclosure. In one embodiment, FIG. 12 illustrates a functional block diagram of a communication station that may be suitable for use as a Wi-Fi device in accordance with some embodiments. The communication station 1200 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1200 may include communications circuitry 1202 and a transceiver 1210 for transmitting and receiving signals to and from other communication stations using one or more antennas 1201. The communications circuitry 1202 may include circuitry that can operate the physical layer (PHY) communications and/or medium access control (MAC) communications for controlling access to the wireless medium, and/or any other communications layers for transmitting and receiving signals. The communication station 1200 may also include processing circuitry 1206 and memory 1208 arranged to perform the operations described herein. In some embodiments, the communications circuitry 1202 and the processing circuitry 1206 may be configured to perform operations detailed in the above figures, diagrams, and flows.

In accordance with some embodiments, the communications circuitry 1202 may be arranged to contend for a wireless medium and configure frames or packets for communicating over the wireless medium. The communications circuitry 1202 may be arranged to transmit and receive signals. The communications circuitry 1202 may also include circuitry for modulation/demodulation, upconversion/downconversion, filtering, amplification, etc. In some embodiments, the processing circuitry 1206 of the communication station 1200 may include one or more processors. In other embodiments, two or more antennas 1201 may be coupled to the communications circuitry 1202 arranged for sending and receiving signals. The memory 1208 may store information for configuring the processing circuitry 1206 to perform operations for configuring and transmitting message frames and performing the various operations described herein. The memory 1208 may include any type of memory, including non-transitory memory, for storing information in a form readable by a machine (e.g., a computer). For example, the memory 1208 may include a computer-readable storage device, read-only memory (ROM), random-access memory (RAM), magnetic disk storage media, optical storage media, flash-memory devices and other storage devices and media.

In some embodiments, the communication station 1200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1200 may include one or more antennas 1201. The antennas 1201 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1200 may include one or more of a keyboard, a display, a non-volatile memory port, multiple antennas, a graphics processor, an application processor, speakers, and other mobile device elements. The display may be an LCD screen including a touch screen.

Although the communication station 1200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1200 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1200 may include one or more processors and may be configured with instructions stored on a computer-readable storage device.

Figure 13:
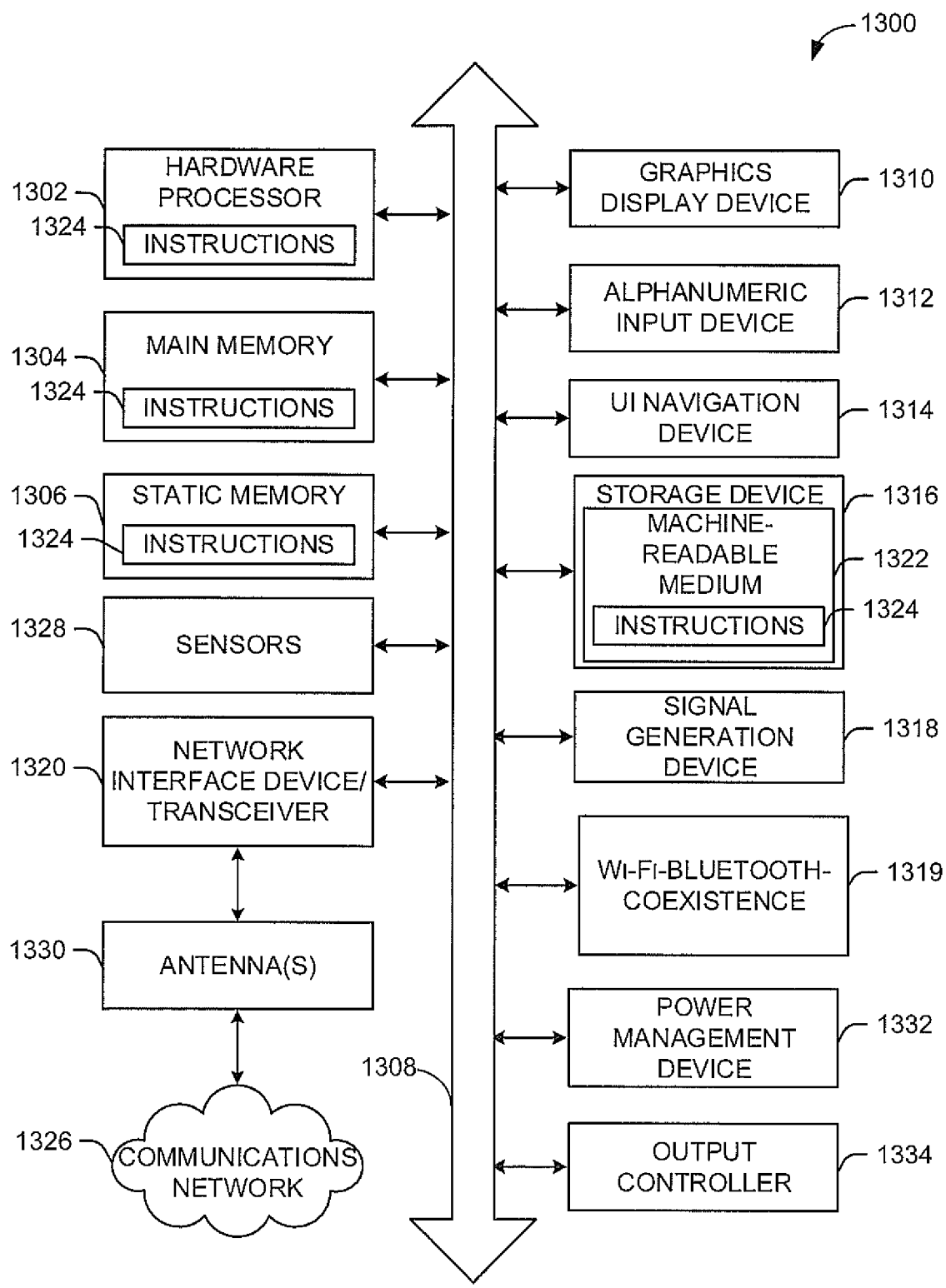
FIG. 13 illustrates a block diagram of an example machine upon which any of one or more techniques (e.g., methods) may be performed, in accordance with one or more example embodiments of the present disclosure.

FIG. 13 illustrates a block diagram of an example of a machine 1300 or system upon which any one or more of the techniques (e.g., methodologies) discussed herein may be performed. In other embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environments. The machine 1300 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a power management device 1332, a graphics display device 1310, an alphanumeric input device 1312 (e.g., a keyboard), and a user interface (UI) navigation device 1314 (e.g., a mouse). In an example, the graphics display device 1310, alphanumeric input device 1312, and UI navigation device 1314 may be a touch screen display. The machine 1300 may additionally include a storage device (e.g., drive unit) 1316, a signal generation device 1318 (e.g., a speaker), a Wi-Fi-Bluetooth-coexistence device 1319, a network interface device/transceiver 1320 coupled to antenna(s) 1330, and one or more sensors 1328, such as a global positioning system (GPS) sensor, a compass, an accelerometer, or other sensor. The machine 1300 may include an output controller 1334, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1302 for generation and processing of the baseband signals and for controlling operations of the main memory 1304, the storage device 1316, and/or the Wi-Fi-Bluetooth-coexistence device 1319. The baseband processor may be provided on a single radio card, a single chip, or an integrated circuit (IC).

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, or within the hardware processor 1302 during execution thereof by the machine 1300. In an example, one or any combination of the hardware processor 1302, the main memory 1304, the static memory 1306, or the storage device 1316 may constitute machine-readable media.

The Wi-Fi-Bluetooth-coexistence device 1319 may carry out or perform any of the operations and processes (e.g., processes 400, 500, 600, 700, 800 and 900) described and shown above.

It is understood that the above are only a subset of what the Wi-Fi-Bluetooth-coexistence device 1319 may be configured to perform and that other functions included throughout this disclosure may also be performed by the Wi-Fi-Bluetooth-coexistence device 1319.

While the machine-readable medium 1322 is illustrated as a single medium, the term "machine-readable medium" may include a single medium or multiple media (e.g., a centralized or distributed database, and/or associated caches and servers) configured to store the one or more instructions 1324.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1300 and that cause the machine 1300 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device/transceiver 1320 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1320 may include one or more physical jacks (e.g., Ethernet, coaxial, or phone jacks) or one or more antennas to connect to the communications network 1326. In an example, the network interface device/transceiver 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1300 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 14:
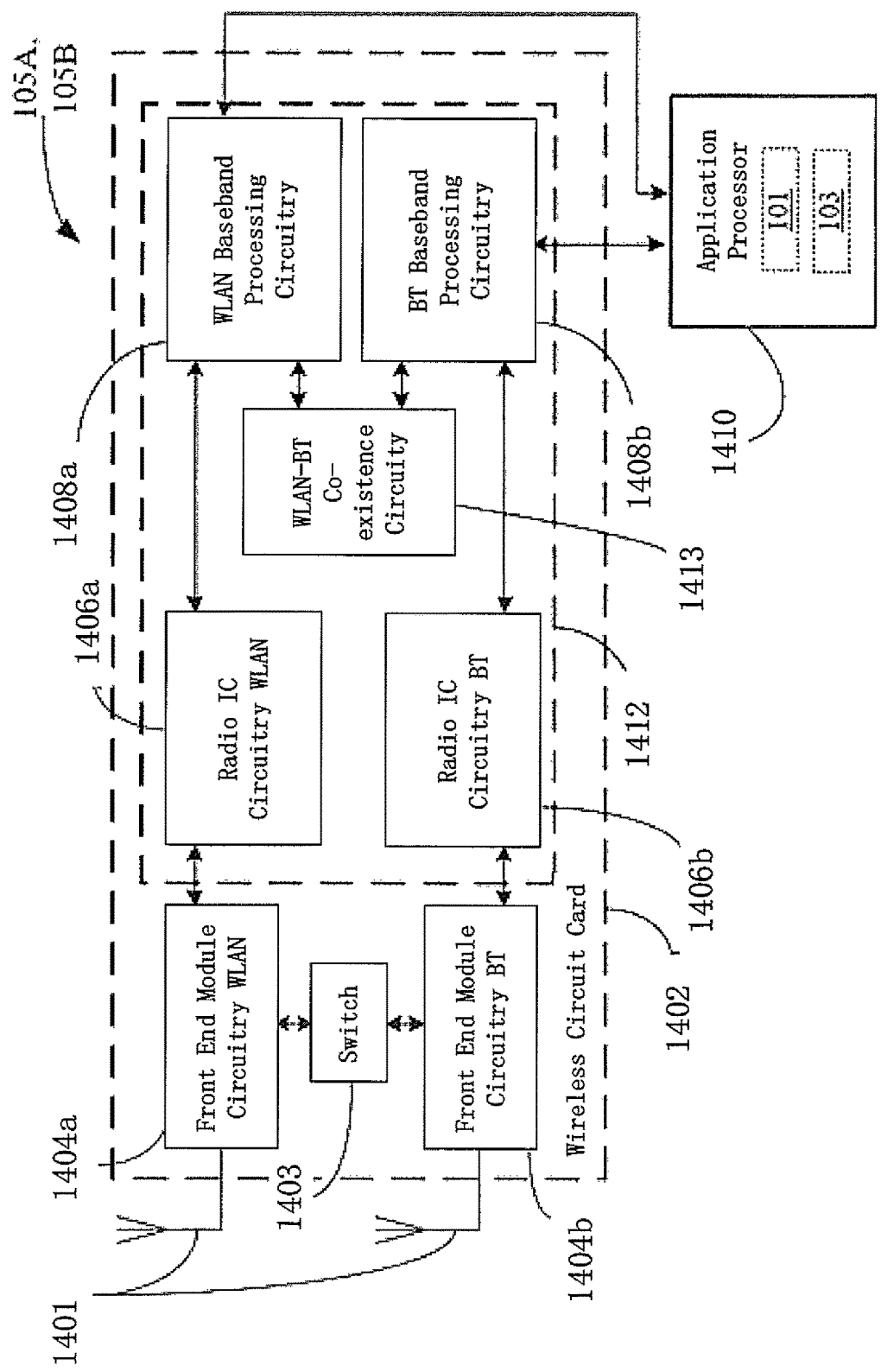
FIG. 14 is a block diagram of a radio architecture in accordance with some examples.

FIG. 14 is a block diagram of a radio architecture 105A, 105B in accordance with some embodiments that may be implemented in any Wi-Fi device described above. Radio architecture 105A, 105B may include radio front-end module (FEM) circuitry 1404*a-b*, radio IC circuitry 1406*a-b* and baseband processing circuitry 1408*a-b*. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1404*a-b* may include a WLAN or Wi-Fi FEM circuitry 1404*a* and a Bluetooth (BT) FEM circuitry 1404*b*. The WLAN FEM circuitry 1404*a* may include a receive signal path comprising circuitry configured to operate on WLAN RF signals received from one or more antennas 1401, to amplify the received signals and to provide the amplified versions of the received signals to the WLAN radio IC circuitry 1406*a* for further processing. The BT FEM circuitry 1404*b* may include a receive signal path which may include circuitry configured to operate on BT RF signals received from one or more antennas 1401, to amplify the received signals and to provide the amplified versions of the received signals to the BT radio IC circuitry 1406*b* for further processing. FEM circuitry 1404*a* may also include a transmit signal path which may include circuitry configured to amplify WLAN signals provided by the radio IC circuitry 1406*a* for wireless transmission by one or more of the antennas 1401. In addition, FEM circuitry 1404*b* may also include a transmit signal path which may include circuitry configured to amplify BT signals provided by the radio IC circuitry 1406*b* for wireless transmission by the one or more antennas. In the embodiment of FIG. 14, although FEM 1404*a* and FEM 1404*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1406*a-b* as shown may include WLAN radio IC circuitry 1406*a* and BT radio IC circuitry 1406*b*. The WLAN radio IC circuitry 1406*a* may include a receive signal path which may include circuitry to down-convert WLAN RF signals received from the FEM circuitry 1404*a* and provide baseband signals to WLAN baseband processing circuitry 1408*a*. BT radio IC circuitry 1406*b* may in turn include a receive signal path which may include circuitry to down-convert BT RF signals received from the FEM circuitry 1404*b* and provide baseband signals to BT baseband processing circuitry 1408*b*. WLAN radio IC circuitry 1406*a* may also include a transmit signal path which may include circuitry to up-convert WLAN baseband signals provided by the WLAN baseband processing circuitry 1408*a* and provide WLAN RF output signals to the FEM circuitry 1404*a* for subsequent wireless transmission by the one or more antennas 1401. BT radio IC circuitry 1406*b* may also include a transmit signal path which may include circuitry to up-convert BT baseband signals provided by the BT baseband processing circuitry 1408*b* and provide BT RF output signals to the FEM circuitry 1404*b* for subsequent wireless transmission by the one or more antennas 1401. In the embodiment of FIG. 14, although radio IC circuitries 1406*a* and 1406*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1408*a-b* may include a WLAN baseband processing circuitry 1408*a* and a BT baseband processing circuitry 1408*b*. The WLAN baseband processing circuitry 1408*a* may include a memory, such as, for example, a set of RAM arrays in a Fast Fourier Transform or Inverse Fast Fourier Transform block (not shown) of the WLAN baseband processing circuitry 1408*a*. Each of the WLAN baseband circuitry 1408*a* and the BT baseband circuitry 1408*b* may further include one or more processors and control logic to process the signals received from the corresponding WLAN or BT receive signal path of the radio IC circuitry 1406*a-b*, and to also generate corresponding WLAN or BT baseband signals for the transmit signal path of the radio IC circuitry 1406*a-b*. Each of the baseband processing circuitries 1408*a* and 1408*b* may further include physical layer (PHY) and medium access control layer (MAC) circuitry, and may further interface with a device for generation and processing of the baseband signals and for controlling operations of the radio IC circuitry 1406*a-b*.

Referring still to FIG. 14, according to the shown embodiment, WLAN-BT coexistence circuitry 1413 may include logic providing an interface between the WLAN baseband circuitry 1408*a* and the BT baseband circuitry 1408*b* to enable use cases requiring WLAN and BT coexistence. In addition, a switch 1403 may be provided between the WLAN FEM circuitry 1404*a* and the BT FEM circuitry 1404*b* to allow switching between the WLAN and BT radios according to application needs. In addition, although the antennas 1401 are depicted as being respectively connected to the WLAN FEM circuitry 1404*a* and the BT FEM circuitry 1404*b*, embodiments include within their scope the sharing of one or more antennas as between the WLAN and BT FEMs, or the provision of more than one antenna connected to each of FEM 1404*a* or 1404*b*.

In some embodiments, the front-end module circuitry 1404*a-b*, the radio IC circuitry 1406*a-b*, and baseband processing circuitry 1408*a-b* may be provided on a single radio card, such as wireless radio card 1402. In some other embodiments, the one or more antennas 1401, the FEM circuitry 1404*a-b* and the radio IC circuitry 1406*a-b* may be provided on a single radio card. In some other embodiments, the radio IC circuitry 1406*a-b* and the baseband processing circuitry 1408*a-b* may be provided on a single chip or integrated circuit (IC), such as IC 1412.

In some embodiments, the wireless radio card 1402 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1408b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., SGPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 15:
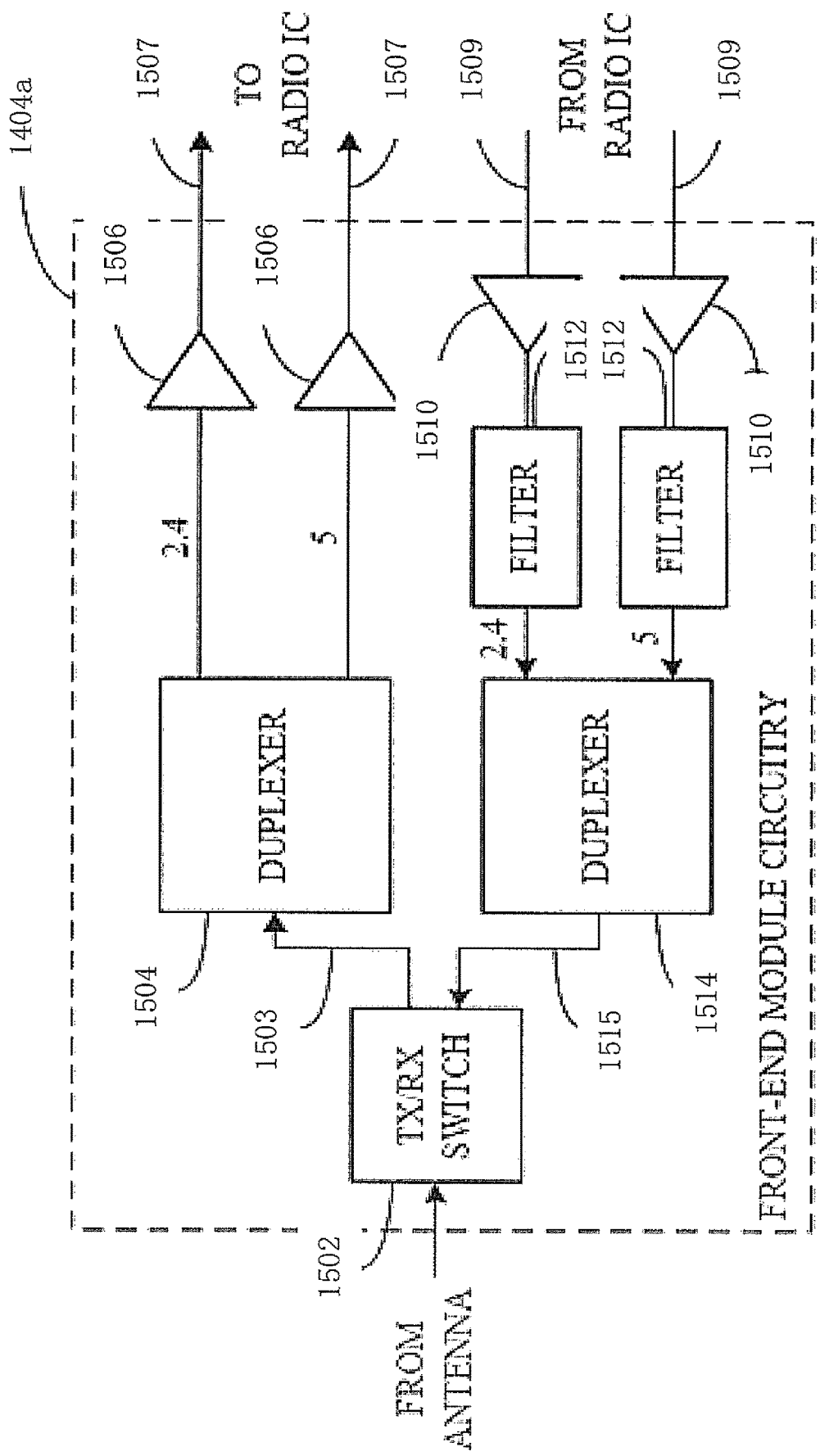
FIG. 15 illustrates an example front-end module circuitry for use in the radio architecture of FIG. 14, in accordance with one or more example embodiments of the present disclosure.

FIG. 15 illustrates WLAN FEM circuitry 1404a in accordance with some embodiments. Although the example of FIG. 15 is described in conjunction with the WLAN FEM circuitry 1404a, the example of FIG. 15 may be described in conjunction with the example BT FEM circuitry 1404b (FIG. 14), although other circuitry configurations may also be suitable.

In some embodiments, the FEM circuitry 1404a may include a TX/RX switch 1502 to switch between transmit mode and receive mode operation. The FEM circuitry 1404a may include a receive signal path and a transmit signal path. The receive signal path of the FEM circuitry 1404a may include a low-noise amplifier (LNA) 1506 to amplify received RF signals 1503 and provide the amplified received RF signals 1507 as an output (e.g., to the radio IC circuitry 1406a-b (FIG. 14)). The transmit signal path of the circuitry 1404a may include a power amplifier (PA) to amplify input RF signals 1509 (e.g., provided by the radio IC circuitry 1406a-b), and one or more filters 1512, such as band-pass filters (BPFs), low-pass filters (LPFs) or other types of filters, to generate RF signals 1515 for subsequent transmission (e.g., by one or more of the antennas 1401 (FIG. 14)) via an example duplexer 1514.

In some dual-mode embodiments for Wi-Fi communication, the FEM circuitry 1404a may be configured to operate in either the 2.4 GHz frequency spectrum or the 5 GHz frequency spectrum. In these embodiments, the receive signal path of the FEM circuitry 1404a may include a receive signal path duplexer 1504 to separate the signals from each spectrum as well as provide a separate LNA 1506 for each spectrum as shown. In these embodiments, the transmit signal path of the FEM circuitry 1404a may also include a power amplifier 1510 and a filter 1512, such as a BPF, an LPF or another type of filter for each frequency spectrum and a transmit signal path duplexer 1504 to provide the signals of one of the different spectrums onto a single transmit path for subsequent transmission by the one or more of the antennas 1401 (FIG. 14). In some embodiments, BT communications may utilize the 2.4 GHz signal paths and may utilize the same FEM circuitry 1404a as the one used for WLAN communications.

Figure 16:
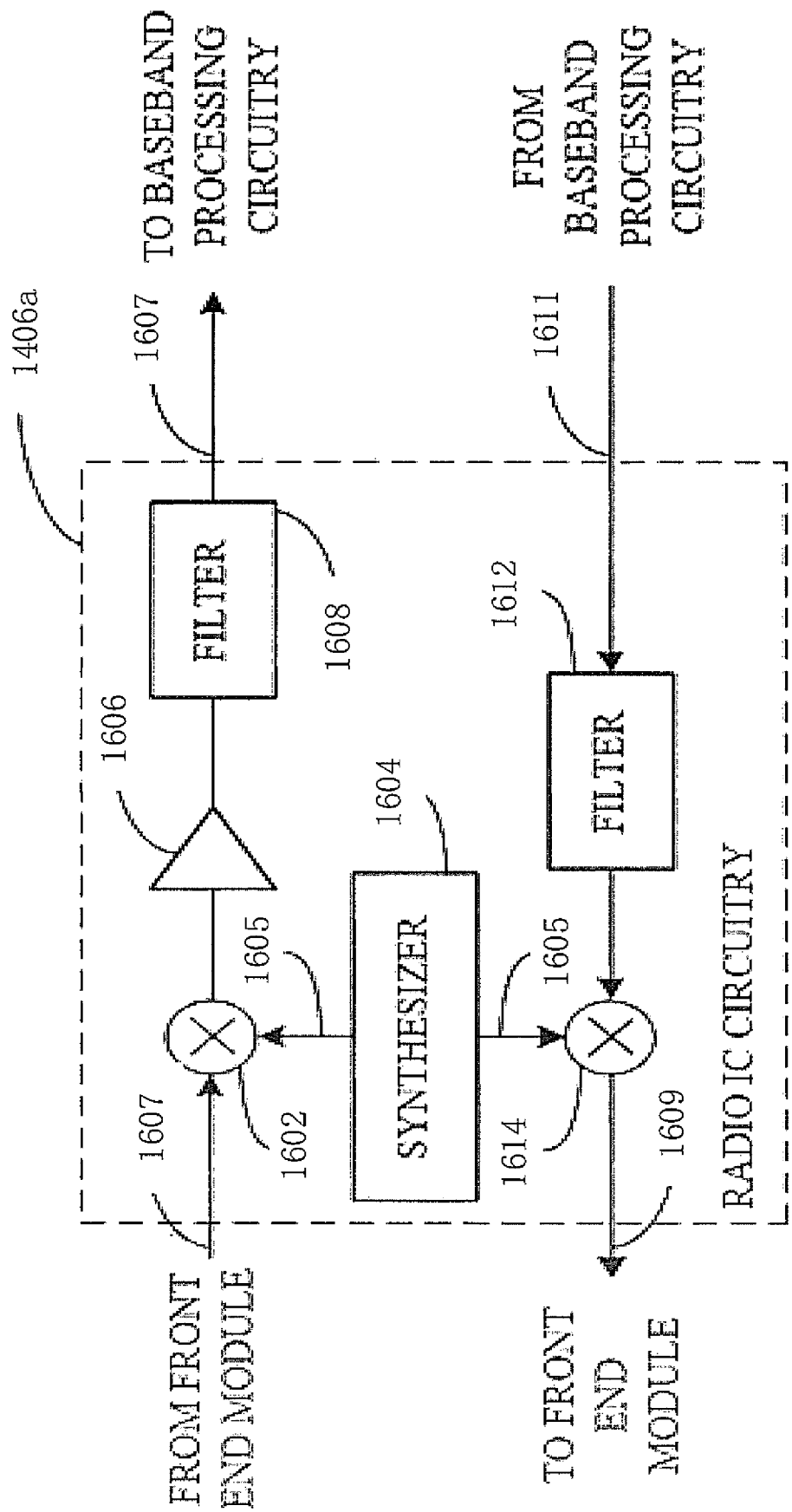
FIG. 16 illustrates an example radio IC circuitry for use in the radio architecture of FIG. 14, in accordance with one or more example embodiments of the present disclosure.

FIG. 16 illustrates radio IC circuitry 1406a in accordance with some embodiments. The radio IC circuitry 1406a is one example of circuitry that may be suitable for use as the WLAN or BT radio IC circuitry 1406a/1406b (FIG. 14), although other circuitry configurations may also be suitable. Alternatively, the example of FIG. 16 may be described in conjunction with the example BT radio IC circuitry 1406b.

In some embodiments, the radio IC circuitry 1406a may include a receive signal path and a transmit signal path. The receive signal path of the radio IC circuitry 1406a may include at least mixer circuitry 1602, such as, for example, down-conversion mixer circuitry, amplifier circuitry 1606 and filter circuitry 1608. The transmit signal path of the radio IC circuitry 1406a may include at least filter circuitry 1612 and mixer circuitry 1614, such as, for example, up-conversion mixer circuitry. Radio IC circuitry 1406a may also include synthesizer circuitry 1604 for synthesizing a frequency 1605 for use by the mixer circuitry 1602 and the mixer circuitry 1614. The mixer circuitry 1602 and/or 1614 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 16 illustrates only a simplified version of a radio IC circuitry, and may include, although not shown, embodiments where each of the depicted circuitries may include more than one component. For instance, mixer circuitry 1614 may each include one or more mixers, and filter circuitries 1608 and/or 1612 may each include one or more filters, such as one or more BPFs and/or LPFs according to application needs. For example, when mixer circuitries are of the direct-conversion type, they may each include two or more mixers.

In some embodiments, mixer circuitry 1602 may be configured to down-convert RF signals 1507 received from the FEM circuitry 1404a-b (FIG. 14) based on the synthesized frequency 1605 provided by synthesizer circuitry 1604. The amplifier circuitry 1606 may be configured to amplify the down-converted signals and the filter circuitry 1608 may include an LPF configured to remove unwanted signals from the down-converted signals to generate output baseband signals 1607. Output baseband signals 1607 may be provided to the baseband processing circuitry 1408a-b (FIG. 14) for further processing. In some embodiments, the output baseband signals 1607 may be zero-frequency baseband signals, although this is not a requirement. In some embodiments, mixer circuitry 1602 may comprise passive mixers, although the scope of the embodiments is not limited in this respect.

In some embodiments, the mixer circuitry 1614 may be configured to up-convert input baseband signals 1611 based on the synthesized frequency 1605 provided by the synthesizer circuitry 1604 to generate RF output signals 1509 for the FEM circuitry 1404a-b. The baseband signals 1611 may be provided by the baseband processing circuitry 1408a-b and may be filtered by filter circuitry 1612. The filter circuitry 1612 may include an LPF or a BPF, although the scope of the embodiments is not limited in this respect.

In some embodiments, the mixer circuitry 1602 and the mixer circuitry 1614 may each include two or more mixers and may be arranged for quadrature down-conversion and/or up-conversion respectively with the help of synthesizer 1604. In some embodiments, the mixer circuitry 1602 and the mixer circuitry 1614 may each include two or more mixers each configured for image rejection (e.g., Hartley image rejection). In some embodiments, the mixer circuitry 1602 and the mixer circuitry 1614 may be arranged for direct down-conversion and/or direct up-conversion, respectively. In some embodiments, the mixer circuitry 1602 and the mixer circuitry 1614 may be configured for super-heterodyne operation, although this is not a requirement.

Mixer circuitry 1602 may comprise, according to one embodiment: quadrature passive mixers (e.g., for the in-phase (I) and quadrature phase (Q) paths). In such an embodiment, RF input signal 1507 from FIG. 16 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1605 of synthesizer 1604 (FIG. 16). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1507 (FIG. 15) may comprise a balanced signal, although the scope of the embodiments is not limited in this respect. The I and Q baseband output signals may be provided to low-noise amplifier, such as amplifier circuitry 1606 (FIG. 16) or to filter circuitry 1608 (FIG. 16).

In some embodiments, the output baseband signals 1607 and the input baseband signals 1611 may be analog baseband signals, although the scope of the embodiments is not limited in this respect. In some alternate embodiments, the output baseband signals 1607 and the input baseband signals 1611 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1604 may be a fractional-N synthesizer or a fractional N/N+1 synthesizer, although the scope of the embodiments is not limited in this respect as other types of frequency synthesizers may be suitable. For example, synthesizer circuitry 1604 may be a delta-sigma synthesizer, a frequency multiplier, or a synthesizer comprising a phase-locked loop with a frequency divider. According to some embodiments, the synthesizer circuitry 1604 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1604 may be provided by a voltage controlled oscillator (VCO), although that is not a requirement. A divider control input may further be provided by either the baseband processing circuitry 1408a-b (FIG. 14) depending on the desired output frequency 1605. In some embodiments, a divider control input (e.g., N) may be determined from a look-up table (e.g., within a Wi-Fi card) based on a channel number and a channel center frequency as determined or indicated by the example application processor 1410. The application processor 1410 may include, or otherwise be connected to, one of the example secure signal converter 101 or the example received signal converter 103 (e.g., depending on which device the example radio architecture is implemented in).

In some embodiments, synthesizer circuitry 1604 may be configured to generate a carrier frequency as the output frequency 1605, while in other embodiments, the output frequency 1605 may be a fraction of the carrier frequency (e.g., one-half the carrier frequency, one-third the carrier frequency). In some embodiments, the output frequency 1605 may be a LO frequency (fLO).

Figure 17:
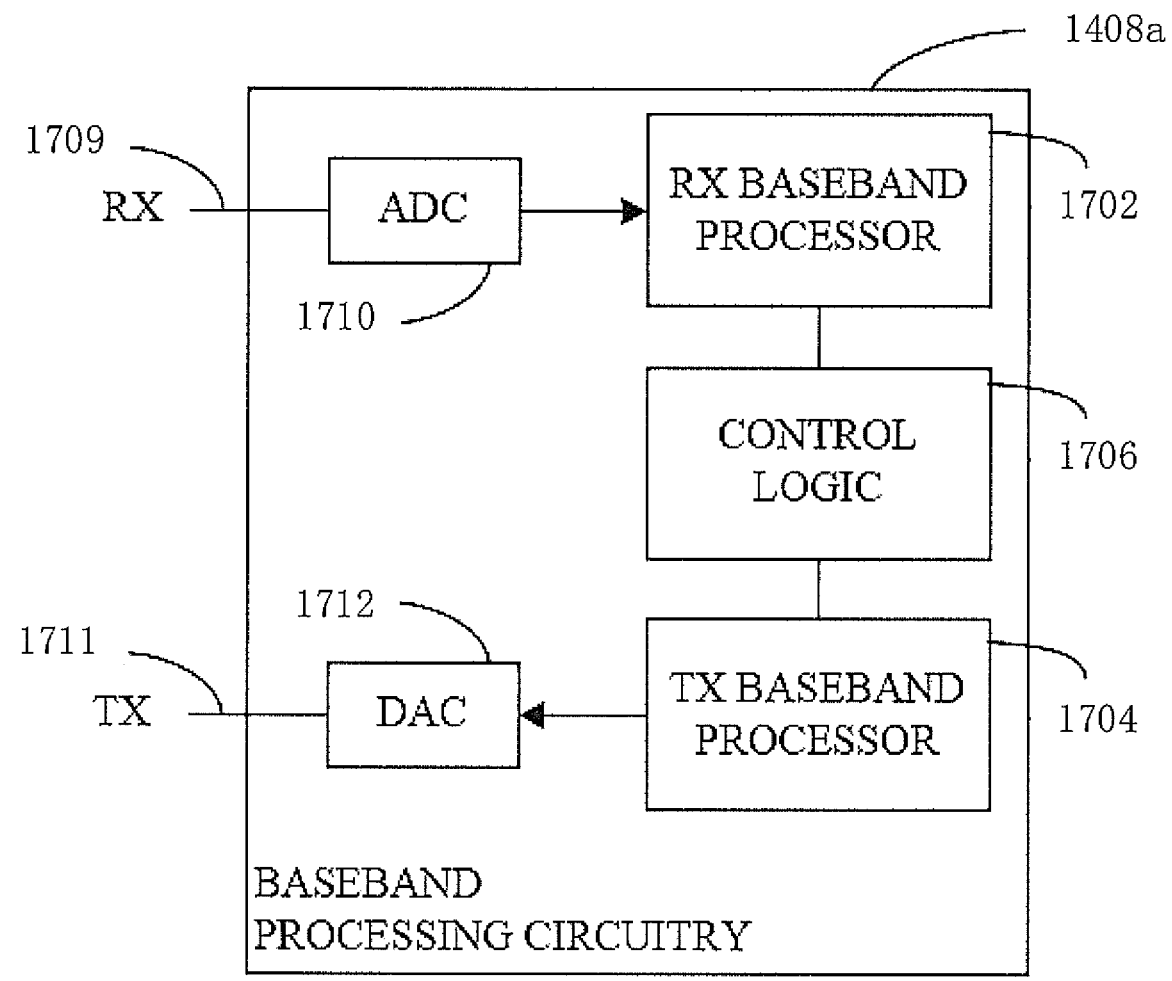
FIG. 17 illustrates an example baseband processing circuitry for use in the radio architecture of FIG. 14, in accordance with one or more example embodiments of the present disclosure.

FIG. 17 illustrates a functional block diagram of baseband processing circuitry 1408a in accordance with some embodiments. The baseband processing circuitry 1408a is one example of circuitry that may be suitable for use as the baseband processing circuitry 1408a (FIG. 14), although other circuitry configurations may also be suitable. Alternatively, the example of FIG. 16 may be used to implement the example BT baseband processing circuitry 1408b of FIG. 14.

The baseband processing circuitry 1408a may include a receive baseband processor (RX BBP) 1702 for processing receive baseband signals 1609 provided by the radio IC circuitry 1406a-b (FIG. 14) and a transmit baseband processor (TX BBP) 1704 for generating transmit baseband signals 1611 for the radio IC circuitry 1406a-b. The baseband processing circuitry 1408a may also include control logic 1706 for coordinating the operations of the baseband processing circuitry 1408a.

In some embodiments (e.g., when analog baseband signals are exchanged between the baseband processing circuitry 1408a-b and the radio IC circuitry 1406a-b), the baseband processing circuitry 1408a may include ADC 1710 to convert analog baseband signals 1709 received from the radio IC circuitry 1406a-b to digital baseband signals for processing by the RX BBP 1702. In these embodiments, the baseband processing circuitry 1408a may also include DAC 1712 to convert digital baseband signals from the TX BBP 1704 to analog baseband signals 1711.

In some embodiments that communicate OFDM signals or OFDMA signals, such as through baseband processor 1408a, the transmit baseband processor 1704 may be configured to generate OFDM or OFDMA signals as appropriate for transmission by performing an inverse fast Fourier transform (IFFT). The receive baseband processor 1702 may be configured to process received OFDM signals or OFDMA signals by performing an FFT. In some embodiments, the receive baseband processor 1702 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 14, in some embodiments, the antennas 1401 (FIG. 14) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1401 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following paragraphs describe examples of various embodiments.

Example 1 includes an apparatus for a User Equipment (UE), the apparatus comprising: a wireless fidelity (Wi-Fi) module to perform Wi-Fi communication; a Bluetooth module to perform Bluetooth communication; and interface circuitry coupled with both of the Wi-Fi module and the Bluetooth module; wherein the Wi-Fi module is to: obtain event schedule information from the Bluetooth module via the interface circuitry, wherein the event schedule information is to indicate information about a schedule of the Bluetooth communication; and puncture, based on the event schedule information, a secondary channel for the Wi-Fi communication to reserve a sub-channel for the Bluetooth communication.

Example 2 includes the apparatus of Example 1, wherein the event schedule information is to indicate a bandwidth of the sub-channel, start time of the Bluetooth communication, or a duration of the Bluetooth communication.

Example 3 includes the apparatus of Example 2, wherein the Wi-Fi module is to: puncture the secondary channel for the Wi-Fi communication to reserve the sub-channel with the bandwidth starting from the start time for the duration.

Example 4 includes the apparatus of Example 2, wherein the bandwidth of the sub-channel includes 1 MHz or 2 MHz.

Example 5 includes the apparatus of Example 1, wherein the secondary channel for the Wi-Fi communication is 20 MHz in bandwidth.

Example 6 includes the apparatus of Example 1, wherein the Wi-Fi module is further to: obtain the event schedule information from the Bluetooth module ahead of a time period than occurrence of the Bluetooth communication.

Example 7 includes the apparatus of Example 1, wherein the schedule of the Bluetooth communication is periodic or bursty.

Example 8 includes the apparatus of Example 1, wherein the Bluetooth communication includes a Bluetooth Low Energy (BLE) advertising message or a Basic Rate/Enhanced Data Rate (BR/EDR) inquiry/page packet.

Example 9 includes the apparatus of Example 1, wherein the Wi-Fi module is further to: puncture the secondary channel for the Wi-Fi communication to further reserve a guard channel on either side of the sub-channel.

Example 10 includes the apparatus of Example 9, wherein the guard channel is 1IVIElz in bandwidth.

Example 11 includes an apparatus for a User Equipment (UE), the apparatus comprising: a wireless fidelity (Wi-Fi) module to perform Wi-Fi communication; a Bluetooth module to perform Bluetooth communication; and interface circuitry coupled with both of the Wi-Fi module and the Bluetooth module; wherein the Bluetooth module is to: generate event schedule information for transmission to the Wi-Fi module via the interface circuitry, wherein the event schedule information is to indicate information about a schedule of the Bluetooth communication; and cause to perform the Bluetooth communication via a sub-channel after a time period since the transmission of the event schedule information to the Wi-Fi module, wherein the sub-channel is punctured from a secondary channel for the Wi-Fi communication by the Wi-Fi module based on the event schedule information.

Example 12 includes the apparatus of Example 11, wherein the event schedule information is to indicate a bandwidth of the sub-channel, start time of the Bluetooth communication, or a duration of the Bluetooth communication.

Example 13 includes the apparatus of Example 12, wherein the bandwidth of the sub-channel includes 1 MHz or 2 MHz.

Example 14 includes the apparatus of Example 11, wherein the secondary channel for the Wi-Fi communication is 20 MHz in bandwidth.

Example 15 includes the apparatus of Example 11, wherein the schedule of the Bluetooth communication is periodic or bursty.

Example 16 includes the apparatus of Example 11, wherein the Bluetooth communication includes a Bluetooth Low Energy (BLE) advertising message or a Basic Rate/Enhanced Data Rate (BR/EDR) inquiry/page packet.

Example 17 includes an apparatus for a wireless fidelity (Wi-Fi) Access Point (AP), the apparatus comprising: a Radio Frequency (RF) interface; and processor circuitry coupled with the RF interface; wherein the processor circuitry is to: obtain a puncturing schedule received from a User Equipment (UE) via the RF interface; and puncture, based on the puncturing schedule, a secondary channel for Wi-Fi communication with the UE, to reserve a sub-channel for Bluetooth communication of the UE, wherein the puncturing schedule is based on information about a schedule of the Bluetooth communication of the UE.

Example 18 includes the apparatus of Example 17, wherein the information about a schedule of the Bluetooth communication of the UE includes a bandwidth of the sub-channel, start time of the Bluetooth communication, or a duration of the Bluetooth communication.

Example 19 includes the apparatus of Example 18, wherein the processor circuitry is to: puncture the secondary channel for the Wi-Fi communication to reserve the sub-channel with the bandwidth starting from the start time for the duration.

Example 20 includes the apparatus of Example 18, wherein the bandwidth of the sub-channel includes 1 MHz or 2 MHz.

Example 21 includes the apparatus of Example 17, wherein the secondary channel for the Wi-Fi communication is 20 MHz in bandwidth.

Example 22 includes the apparatus of Example 17, wherein the processor circuitry is further to: obtain the puncturing schedule from the UE ahead of a time period than occurrence of the Bluetooth communication.

Example 23 includes the apparatus of Example 17, wherein the processor circuitry is further to: puncture the secondary channel for the Wi-Fi communication to further reserve a guard channel on either side of the sub-channel.

Example 24 includes an apparatus for a User Equipment (UE), the apparatus comprising: means for obtaining event schedule information from a Bluetooth module of the UE, wherein the event schedule information is to indicate information about a schedule of Bluetooth communication which is to be performed by the Bluetooth module; and means for puncturing, based on the event schedule information, a secondary channel for Wi-Fi communication of the UE to reserve a sub-channel for the Bluetooth communication.

Example 25 includes the apparatus of Example 24, wherein the event schedule information is to indicate a bandwidth of the sub-channel, start time of the Bluetooth communication, or a duration of the Bluetooth communication.

Example 26 includes the apparatus of Example 25, further comprising: means for puncturing the secondary channel for the Wi-Fi communication to reserve the sub-channel with the bandwidth starting from the start time for the duration.

Example 27 includes the apparatus of Example 25, wherein the bandwidth of the sub-channel includes 1 MHz or 2 MHz.

Example 28 includes the apparatus of Example 24, wherein the secondary channel for the Wi-Fi communication is 20 MHz in bandwidth.

Example 29 includes the apparatus of Example 24, further comprising: means for obtaining the event schedule information from the Bluetooth module ahead of a time period than occurrence of the Bluetooth communication.

Example 30 includes the apparatus of Example 24, wherein the schedule of the Bluetooth communication is periodic or bursty.

Example 31 includes the apparatus of Example 24, wherein the Bluetooth communication includes a Bluetooth Low Energy (BLE) advertising message or a Basic Rate/Enhanced Data Rate (BR/EDR) inquiry/page packet.

Example 32 includes the apparatus of Example 24, further comprising: means for puncturing the secondary channel for the Wi-Fi communication to further reserve a guard channel on either side of the sub-channel.

Example 33 includes the apparatus of Example 32, wherein the guard channel is 1 MHz in bandwidth.

Example 34 includes an apparatus for a User Equipment (UE), the apparatus comprising: means for generating event schedule information for transmission to a Wi-Fi module of the UE, wherein the event schedule information is to indicate information about a schedule of Bluetooth communication; and means for performing the Bluetooth communication via a sub-channel after a time period since the transmission of the event schedule information to the Wi-Fi module, wherein the sub-channel is punctured by the Wi-Fi module from a secondary channel for Wi-Fi communication based on the event schedule information.

Example 35 includes the apparatus of Example 34, wherein the event schedule information is to indicate a bandwidth of the sub-channel, start time of the Bluetooth communication, or a duration of the Bluetooth communication.

Example 36 includes the apparatus of Example 35, wherein the bandwidth of the sub-channel includes 1 MHz or 2 MHz.

Example 37 includes the apparatus of Example 34, wherein the secondary channel for the Wi-Fi communication is 20 MHz in bandwidth.

Example 38 includes the apparatus of Example 34, wherein the schedule of the Bluetooth communication is periodic or bursty.

Example 39 includes the apparatus of Example 34, wherein the Bluetooth communication includes a Bluetooth Low Energy (BLE) advertising message or a Basic Rate/Enhanced Data Rate (BR/EDR) inquiry/page packet.

Example 40 includes an apparatus for a wireless fidelity (Wi-Fi) Access Point (AP), the apparatus comprising: means for obtaining a puncturing schedule received from a User Equipment (UE); and means for puncturing, based on the puncturing schedule, a secondary channel for Wi-Fi communication with the UE, to reserve a sub-channel for Bluetooth communication of the UE, wherein the puncturing schedule is based on information about a schedule of the Bluetooth communication of the UE.

Example 41 includes the apparatus of Example 40, wherein the information about a schedule of the Bluetooth communication of the UE includes a bandwidth of the sub-channel, start time of the Bluetooth communication, or a duration of the Bluetooth communication.

Example 42 includes the apparatus of Example 41, further comprising: means for puncturing the secondary channel for the Wi-Fi communication to reserve the sub-channel with the bandwidth starting from the start time for the duration.

Example 43 includes the apparatus of Example 41, wherein the bandwidth of the sub-channel includes 1 MHz or 2 MHz.

Example 44 includes the apparatus of Example 40, wherein the secondary channel for the Wi-Fi communication is 20 MHz in bandwidth.

Example 45 includes the apparatus of Example 40, further comprising: means for obtaining the puncturing schedule from the UE ahead of a time period than occurrence of the Bluetooth communication.

Example 46 includes the apparatus of Example 40, further comprising: means for puncturing the secondary channel for the Wi-Fi communication to further reserve a guard channel on either side of the sub-channel.

Example 47 includes a method, method comprising: obtaining event schedule information from a Bluetooth module of a User Equipment (UE), wherein the event schedule information is to indicate information about a schedule of Bluetooth communication which is to be performed by the Bluetooth module; and puncturing, based on the event schedule information, a secondary channel for Wi-Fi communication of the UE to reserve a sub-channel for the Bluetooth communication.

Example 48 includes the method of Example 47, wherein the event schedule information is to indicate a bandwidth of the sub-channel, start time of the Bluetooth communication, or a duration of the Bluetooth communication.

Example 49 includes the method of Example 48, further comprising: puncturing the secondary channel for the Wi-Fi communication to reserve the sub-channel with the bandwidth starting from the start time for the duration.

Example 50 includes the method of Example 48, wherein the bandwidth of the sub-channel includes 1 MHz or 2 MHz.

Example 51 includes the method of Example 47, wherein the secondary channel for the Wi-Fi communication is 20 MHz in bandwidth.

Example 52 includes the method of Example 47, further comprising: obtaining the event schedule information from the Bluetooth module ahead of a time period than occurrence of the Bluetooth communication.

Example 53 includes the method of Example 47, wherein the schedule of the Bluetooth communication is periodic or bursty.

Example 54 includes the method of Example 47, wherein the Bluetooth communication includes a Bluetooth Low Energy (BLE) advertising message or a Basic Rate/Enhanced Data Rate (BR/EDR) inquiry/page packet.

Example 55 includes the method of Example 47, further comprising: puncturing the secondary channel for the Wi-Fi communication to further reserve a guard channel on either side of the sub-channel.

Example 56 includes the method of Example 55, wherein the guard channel is 1 MHz in bandwidth.

Example 57 includes a method, comprising: generating event schedule information for transmission to a Wi-Fi module of a User Equipment (UE), wherein the event schedule information is to indicate information about a schedule of Bluetooth communication; and performing the Bluetooth communication via a sub-channel after a time period since the transmission of the event schedule information to the Wi-Fi module, wherein the sub-channel is punctured by the Wi-Fi module from a secondary channel for Wi-Fi communication based on the event schedule information.

Example 58 includes the method of Example 57, wherein the event schedule information is to indicate a bandwidth of the sub-channel, start time of the Bluetooth communication, or a duration of the Bluetooth communication.

Example 59 includes the method of Example 58, wherein the bandwidth of the sub-channel includes 1 MHz or 2 MHz.

Example 60 includes the method of Example 57, wherein the secondary channel for the Wi-Fi communication is 20 MHz in bandwidth.

Example 61 includes the method of Example 57, wherein the schedule of the Bluetooth communication is periodic or bursty.

Example 62 includes the method of Example 57, wherein the Bluetooth communication includes a Bluetooth Low Energy (BLE) advertising message or a Basic Rate/Enhanced Data Rate (BR/EDR) inquiry/page packet.

Example 63 includes a method, comprising: obtaining a puncturing schedule received from a User Equipment (UE); and puncturing, based on the puncturing schedule, a secondary channel for Wi-Fi communication with the UE, to reserve a sub-channel for Bluetooth communication of the UE, wherein the puncturing schedule is based on information about a schedule of the Bluetooth communication of the UE.

Example 64 includes the method of Example 63, wherein the information about a schedule of the Bluetooth communication of the UE includes a bandwidth of the sub-channel, start time of the Bluetooth communication, or a duration of the Bluetooth communication.

Example 65 includes the method of Example 64, further comprising: puncturing the secondary channel for the Wi-Fi communication to reserve the sub-channel with the bandwidth starting from the start time for the duration.

Example 66 includes the method of Example 64, wherein the bandwidth of the sub-channel includes 1 MHz or 2 MHz.

Example 67 includes the method of Example 63, wherein the secondary channel for the Wi-Fi communication is 20 MHz in bandwidth.

Example 68 includes the method of Example 63, further comprising: obtaining the puncturing schedule from the UE ahead of a time period than occurrence of the Bluetooth communication.

Example 69 includes the method of Example 63, further comprising: puncturing the secondary channel for the Wi-Fi communication to further reserve a guard channel on either side of the sub-channel.

Example 70 includes one or more computer-readable media having instructions stored thereon, the instructions when executed by processor circuitry cause the processor circuitry to perform the method of any one of Examples 47 to 62.

Example 71 includes one or more computer-readable media having instructions stored thereon, the instructions when executed by processor circuitry cause the processor circuitry to perform the method of any one of Examples 63 to 69.

Example 72 includes a User Equipment (UE) as shown and described in the description.

Example 73 includes a method performed at a User Equipment (UE) as shown and described in the description.

Example 74 includes an Access Point (AP) as shown and described in the description.

Example 75 includes a method performed at an Access Point (AP) as shown and described in the description.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. The phrases "in an embodiment" "in one embodiment" and "in some embodiments" are used repeatedly herein. The phrase generally does not refer to the same embodiment; however, it may.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus for a User Equipment (UE), the apparatus comprising:
   a wireless fidelity (Wi-Fi) module to perform Wi-Fi communication;
   a Bluetooth module to perform Bluetooth communication; and
   interface circuitry coupled with both of the Wi-Fi module and the Bluetooth module;
   wherein the Wi-Fi module is to:
      obtain event schedule information from the Bluetooth module ahead of a time period than occurrence of the Bluetooth communication via the interface circuitry, wherein the event schedule information is to indicate information about a schedule of the Bluetooth communication; and
      puncture, based on the event schedule information, a secondary channel for the Wi-Fi communication to reserve a sub-channel for the Bluetooth communication,
   wherein the event schedule information is to indicate a bandwidth of the sub-channel, start time of the Bluetooth communication, and a duration of the Bluetooth communication, and
   wherein the time period ahead of the occurrence of the Bluetooth communication is based on interacting time required between the Wi-Fi module and a Wi-Fi Access Point (AP) in updating puncturing schedule and time required by the Bluetooth module for updating hopping sequence.

2. The apparatus of claim 1, wherein the Wi-Fi module is to:
   puncture the secondary channel for the Wi-Fi communication to reserve the sub-channel with the bandwidth starting from the start time for the duration.

3. The apparatus of claim 1, wherein the secondary channel for the Wi-Fi communication is 20 MHz in bandwidth.

4. The apparatus of claim 1, wherein the schedule of the Bluetooth communication is periodic or bursty.

5. The apparatus of claim 1, wherein the Bluetooth communication includes a Bluetooth Low Energy (BLE) advertising message or a Basic Rate/Enhanced Data Rate (BR/EDR) inquiry/page packet.

6. The apparatus of claim 1, wherein the Wi-Fi module is further to:
   puncture the secondary channel for the Wi-Fi communication to further reserve a guard channel on either side of the sub-channel.

7. The apparatus of claim 6, wherein the guard channel is 1 MHz in bandwidth.

8. The apparatus of claim 1, wherein the bandwidth of the sub-channel is 2 MHz.

9. An apparatus for a User Equipment (UE), the apparatus comprising:
   a wireless fidelity (Wi-Fi) module to perform Wi-Fi communication;
   a Bluetooth module to perform Bluetooth communication; and
   interface circuitry coupled with both of the Wi-Fi module and the Bluetooth module;
   wherein the Bluetooth module is to:
      generate event schedule information for transmission, ahead of a time period than occurrence of the Bluetooth communication, to the Wi-Fi module via the interface circuitry, wherein the event schedule information is to indicate information about a schedule of the Bluetooth communication; and
      cause to perform the Bluetooth communication via a sub-channel after a time period since the transmission of the event schedule information to the Wi-Fi module, wherein the sub-channel is punctured from a secondary channel for the Wi-Fi communication by the Wi-Fi module based on the event schedule information,
   wherein the event schedule information is to indicate a bandwidth of the sub-channel, start time of the Bluetooth communication, and a duration of the Bluetooth communication, and wherein the time period ahead of the occurrence of the Bluetooth communication is based on interacting time required between the Wi-Fi module and a Wi-Fi Access Point (AP) in updating puncturing schedule and time required by the Bluetooth module for updating hopping sequence.

10. The apparatus of claim 9, wherein the secondary channel for the Wi-Fi communication is 20 MHz in bandwidth.

11. The apparatus of claim 9, wherein the schedule of the Bluetooth communication is periodic or bursty.

12. The apparatus of claim 9, wherein the Bluetooth communication includes a Bluetooth Low Energy (BLE) advertising message or a Basic Rate/Enhanced Data Rate (BR/EDR) inquiry/page packet.

13. The apparatus of claim 9, wherein the bandwidth of the sub-channel is 2 MHz.

\* \* \* \* \*